Dec. 30, 1930.  E. W. BULLOCK ET AL  1,786,697
MACHINE FOR PRODUCING GEARS
Filed Aug. 8, 1928  12 Sheets-Sheet 1

INVENTOR
E.W.Bullock, A.P.Schauseil,
A.W.Draesette, C.T.Galloway
& M.H.Hitt
BY B.E.Schlesinger
ATTORNEY Dec. 30, 1930.   E. W. BULLOCK ET AL   1,786,697
MACHINE FOR PRODUCING GEARS
Filed Aug. 8, 1928   12 Sheets-Sheet 3

INVENTOR
E.W.Bullock, A.P.Schauseil,
A.W.Draeseke, C.T.Galloway
& M.H.Hill
BY B.S.Schlesinger   ATTORNEY

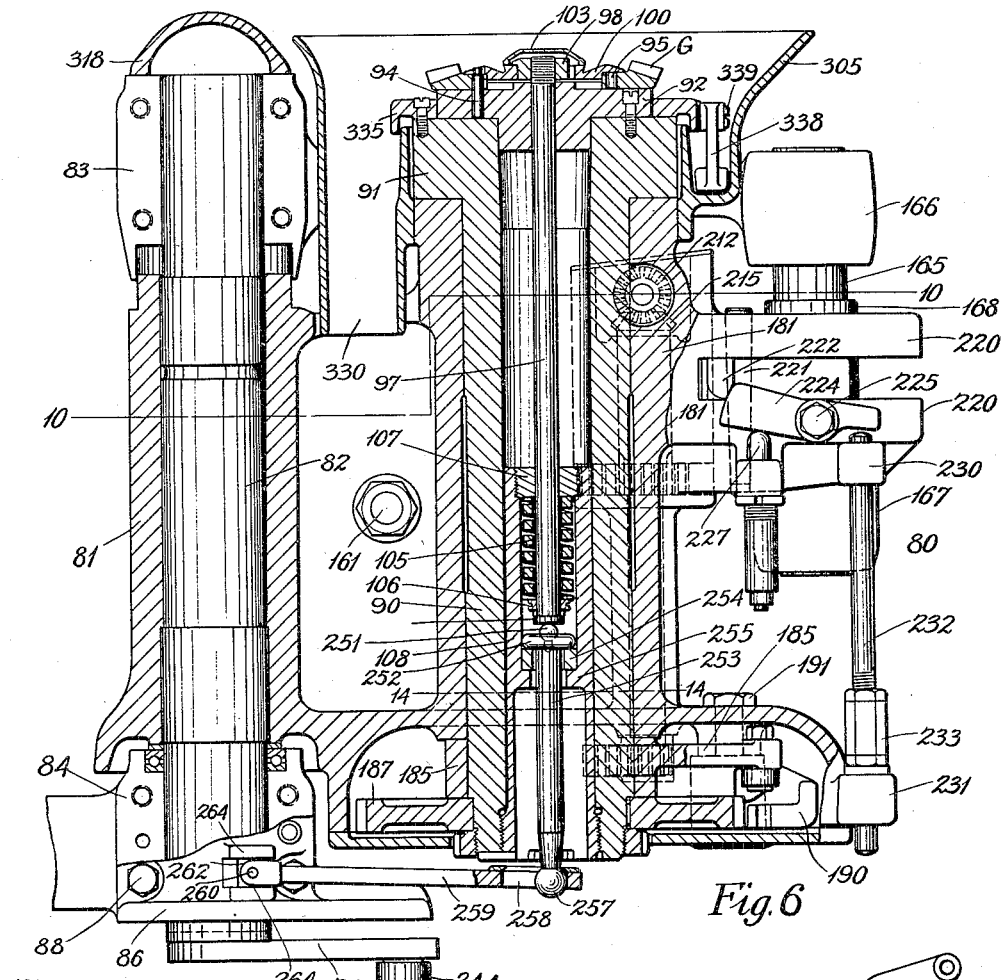
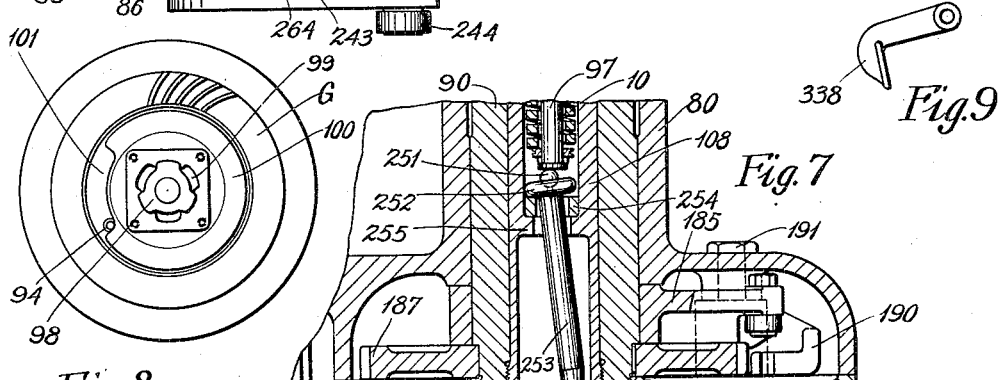

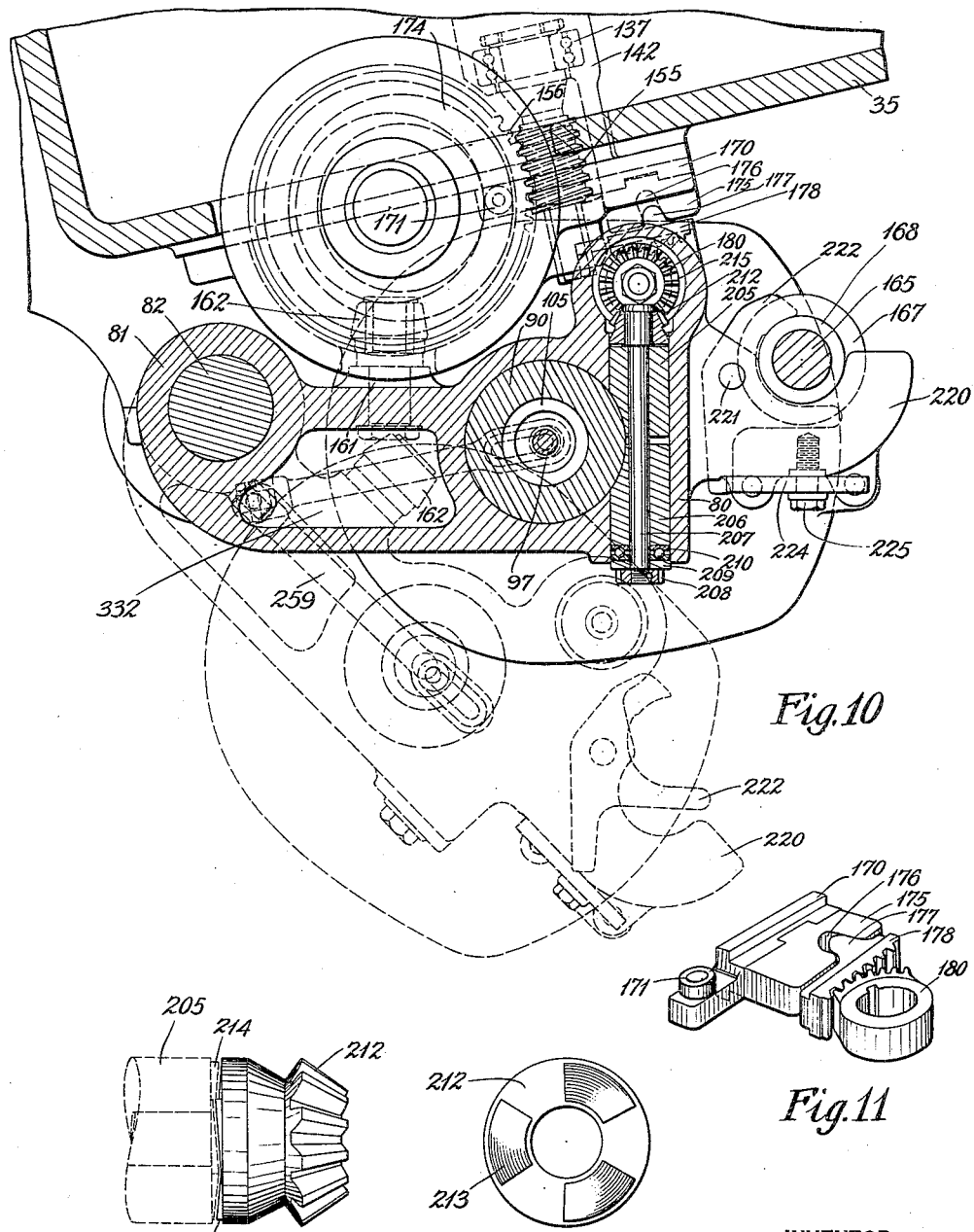

INVENTOR
E. W. Bullock, A. P. Schauseil
A. W. Draeseke, C. T. Galloway
& M. H. Hill
BY [signature]
ATTORNEY

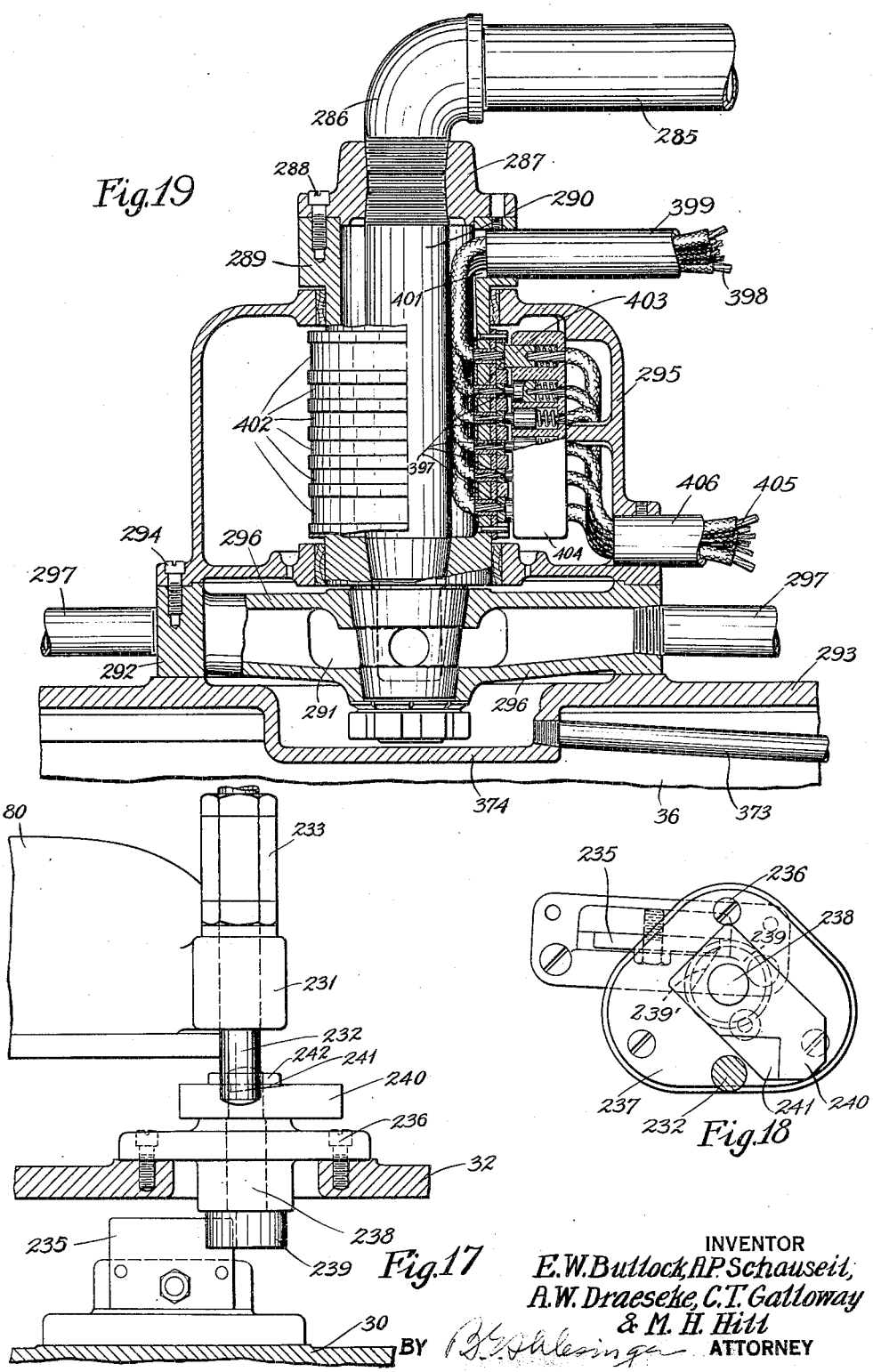

INVENTOR
E.W. Bullock, A.P. Schauseil
A.W. Draesehe, C.T. Galloway
& M.H. Hitt
BY
ATTORNEY

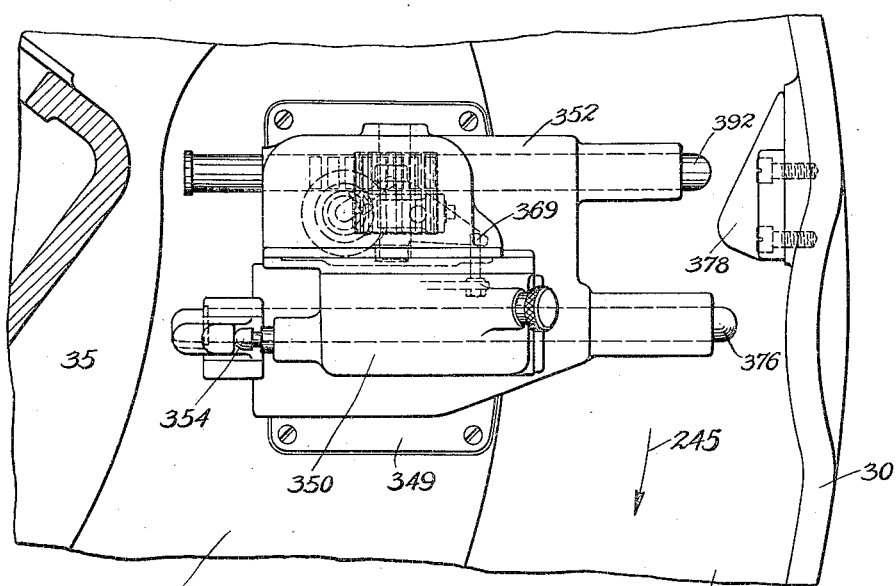
Fig. 22
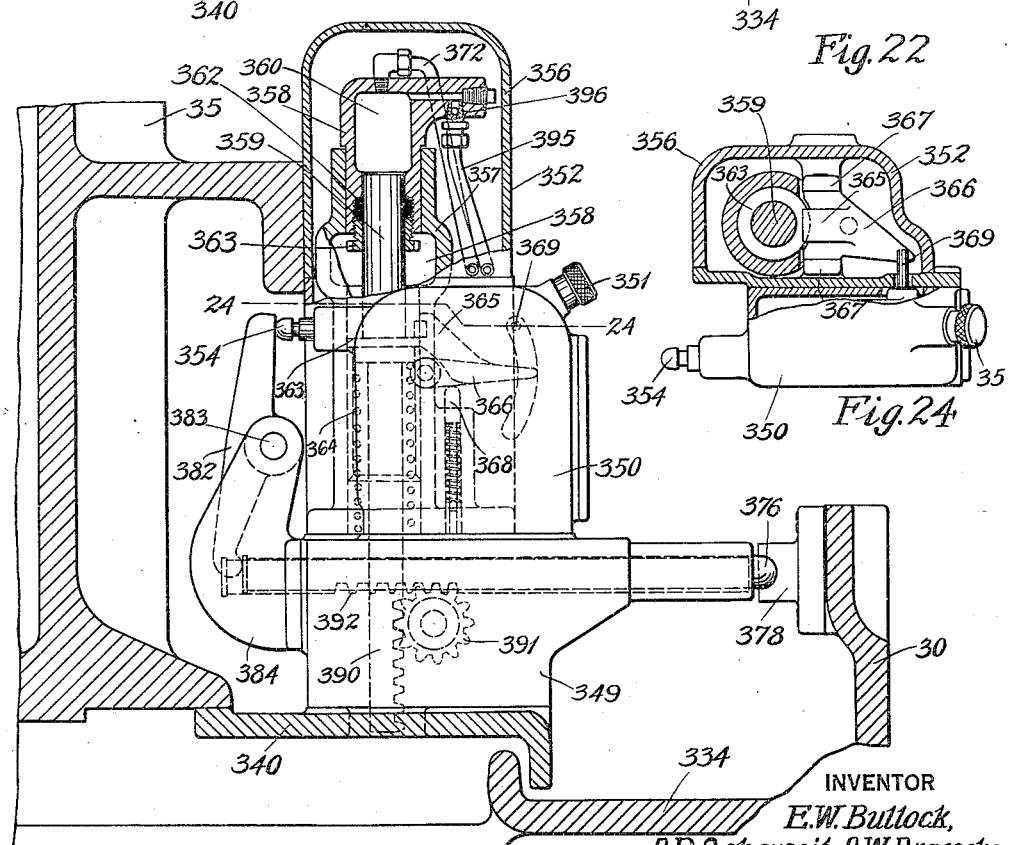
Fig. 23
Fig. 24

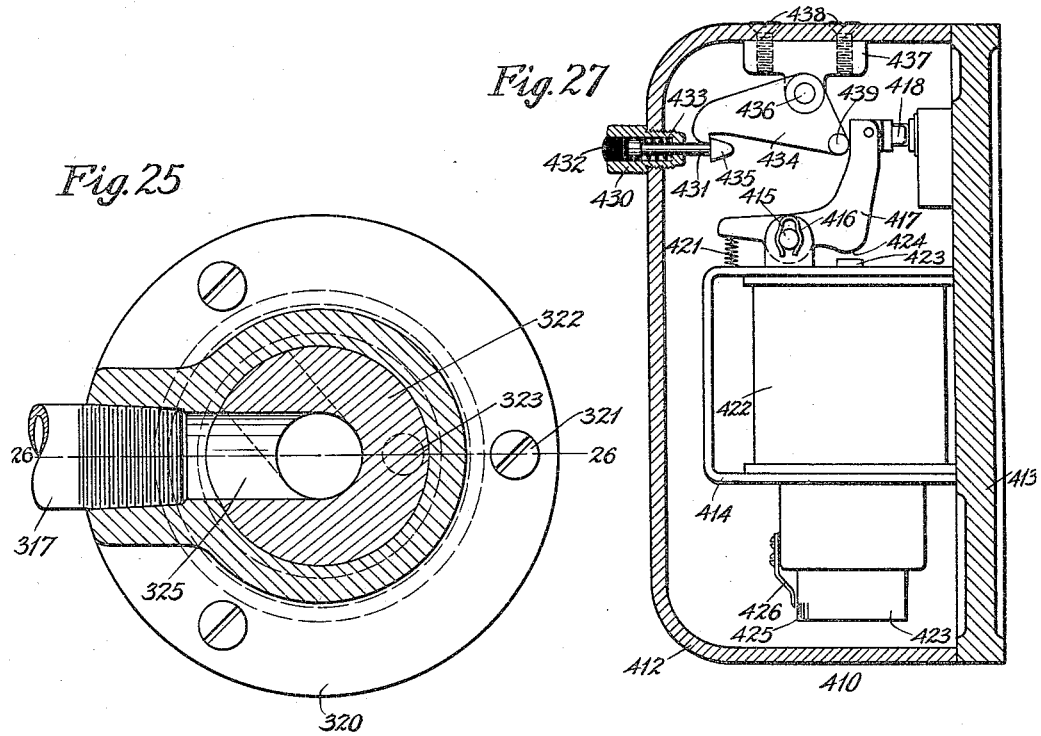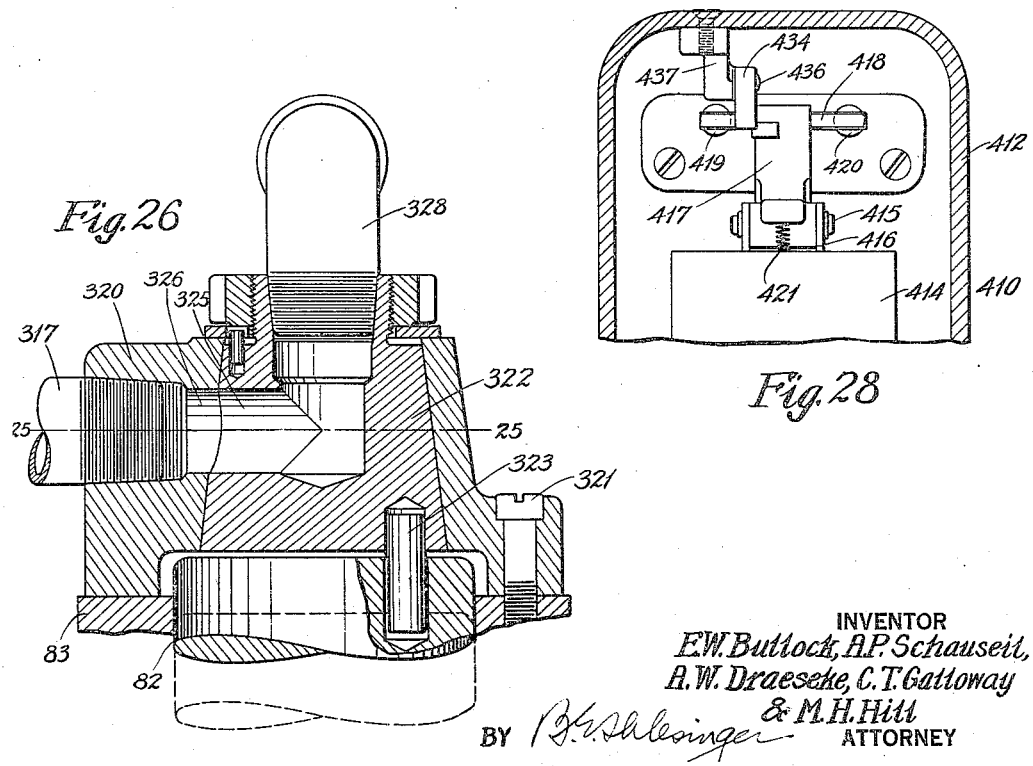

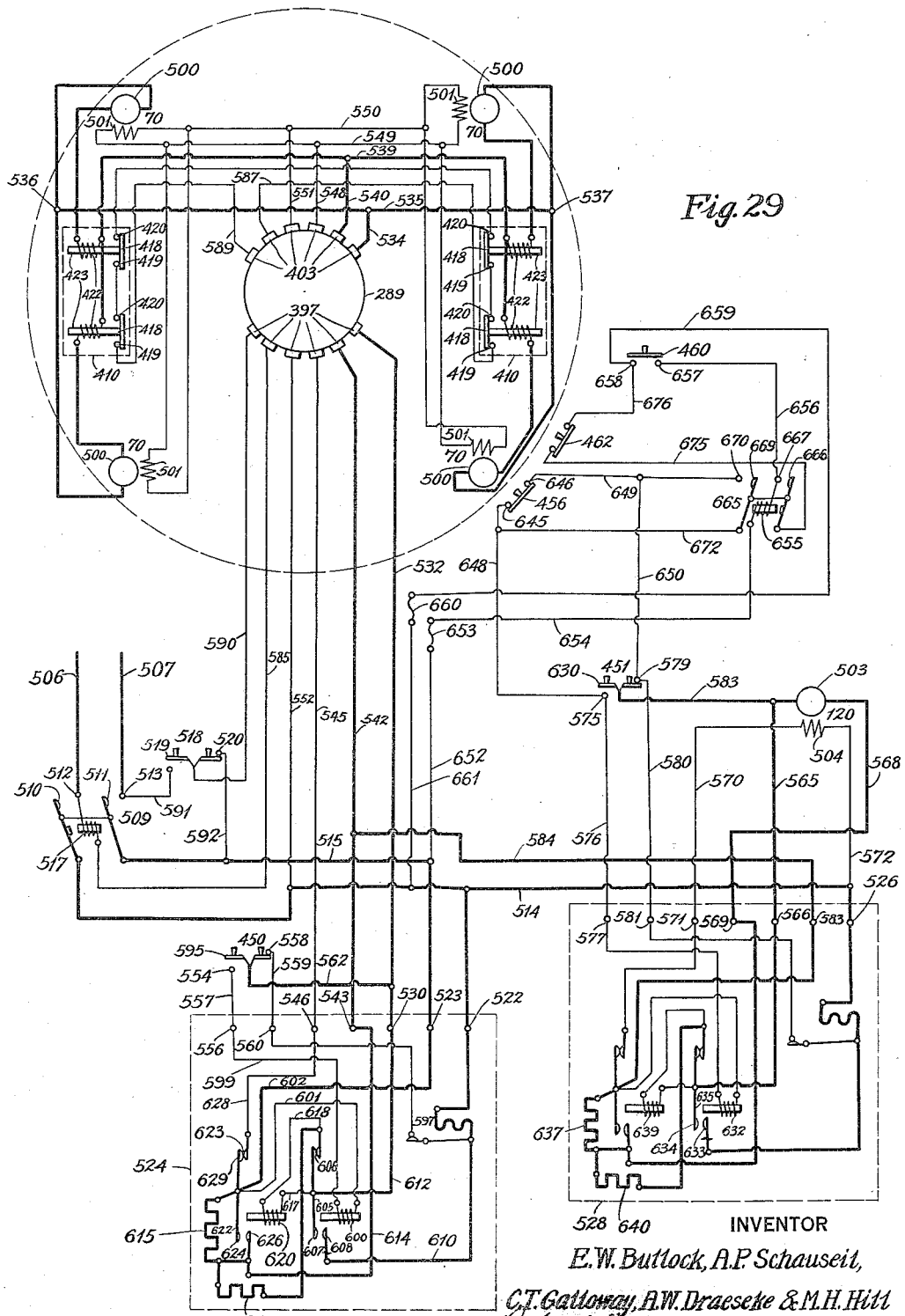

Patented Dec. 30, 1930

1,786,697

UNITED STATES PATENT OFFICE

EDWARD W. BULLOCK, ALBERT P. SCHAUSEIL, ALFRED W. DRAESEKE, CLARENCE T. GALLOWAY, AND MAXWELL H. HILL, OF ROCHESTER, NEW YORK, ASSIGNORS TO GLEASON WORKS, OF ROCHESTER, NEW YORK, A CORPORATION OF NEW YORK

MACHINE FOR PRODUCING GEARS

Application filed August 8, 1928. Serial No. 298,320.

The subject of the present invention is a machine tool and in one aspect, the present invention relates to a machine on which a plurality of work pieces are simultaneously operated upon by a plurality of tools. In a more particular aspect, the present invention relates to a machine for producing gears and more specifically to a machine for roughing longitudinally curved tooth tapered gears, as spiral bevel and hypoid gears.

Among the objects of this invention are to provide a machine for roughing longitudinally curved tooth gears which will be very rapid in operation, which will permit of cutting a plurality of blanks simultaneously under the supervision of a single operator and which will be of minimum over-all dimensions.

A further object of the invention is to provide a machine in which, without any increase in dimensions, the work can be moved entirely clear of the tools after the operations thereon have been completed to permit the operator to readily remove the completed gears and chuck new blanks, and to provide means for automatically returning the work supports or heads into operative position after the new blanks have been chucked.

Still another object of this invention is to provide, in a machine of the character described, means whereby the movement of a work head away from the tool releases the chucking mechanism thereby reducing to a minimum the time required for removal of the completed work and chucking of a new piece.

A further purpose of this invention is to provide means actuated by the movement of the work to and from operative position for shutting off the coolant or cutting oil and for turning it on again, respectively, whereby wasting and spattering of the cutting oil is entirely eliminated.

A further object of this invention is to provide an automatic control for the lubricating mechanism which will eliminate wasting of the lubricating oil and flooding of the machine and at the same time will insure lubrication of the machine parts at proper intervals.

The present invention relates particularly to a machine of the type in which a plurality of work heads are paired with a plurality of tools so that each blank is operated upon by the corresponding tool during the rotation of a continuously rotatable turret on which both tools and work heads are mounted, in which the work pieces are completed in one revolution of the turret, in which removal of the completed work pieces and chucking of new blanks is effected at a loading station where the work heads are successively moved away from and back into engagement with the tools automatically and in which the completed work must be removed from each work head and a new blank chucked in a definite time, and a further object of this invention is to provide means for safe-guarding the operator from injury and the machine from damage due to a possible failure of the operator to remove the completed work and chuck a new piece in the time alotted him by the cycle of operation of the machine. To this end, means is provided for stopping the machine automatically if the chucking operations have not been completed in the allotted time. To avoid loss of time, however, where the chucking operations may have been completed within the required period, it is a further object of this invention to provide means whereby the operator may, after he has completed the chucking operation, render the automatic safety stop mechanism inoperative so that the machine will continue in operation without stopping at the predetermined stopping point.

Other objects of the invention will be referred to hereinafter and will be apparent to those skilled in this art from the specification and from the recital of the appended claims.

In the drawings:

Figure 6 is a vertical sectional view through one of the work heads and its associated parts taken on the line 6—6 of Figure 4;

Figure 7 is a fragmentary sectional view taken in the same plane as Fig. 6 showing the chuck operating mechanism illustrated in Figure 6 in the chuck releasing position assumed when the work head has swung away from the turret at the loading station;

Figure 8 is a plan view of the work spindle with a gear chucked thereon and showing further details of the chucking mechanism;

Figure 9 is a view of one of the wipers which are secured to the heads of the work spindles for sweeping the coolant and chips out of the work head guard;

Figure 10 is a section on the line 10—10 of Figure 6 showing in dotted lines, also, the work head in its swung-away position at the loading station;

Figure 11 is a perspective view showing parts of the index actuating mechanism;

Figures 12 and 13 are details of the lock-up mechanism for securing the work spindle against movement during the cutting;

Figure 16:
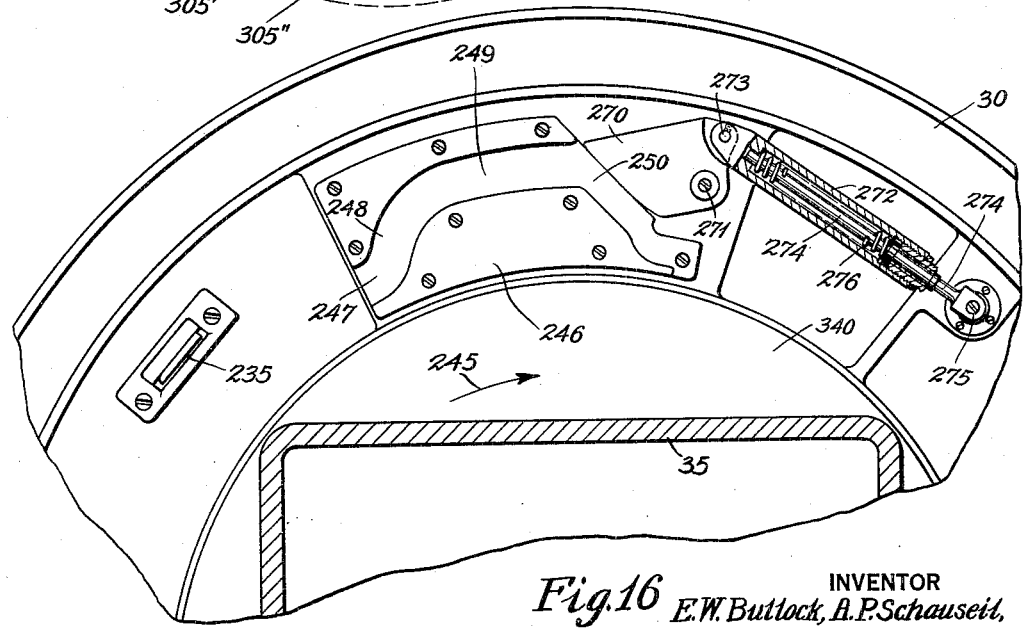
Figure 20:
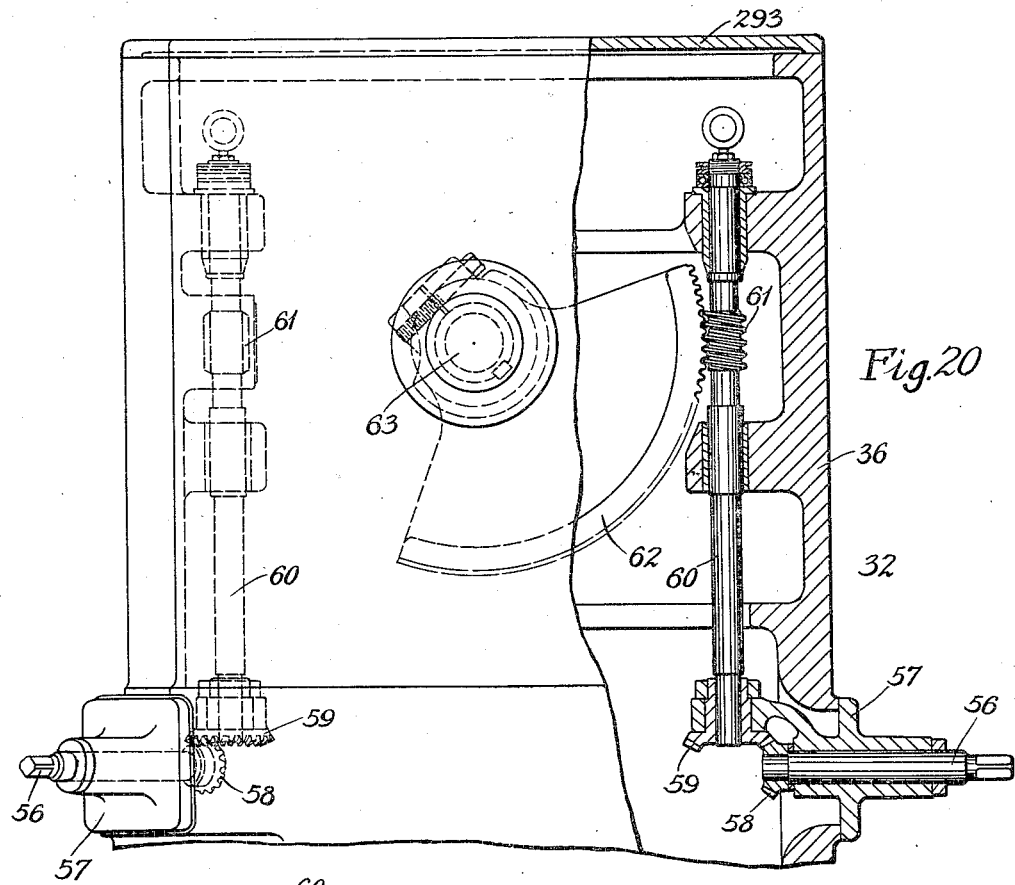
Figure 21:
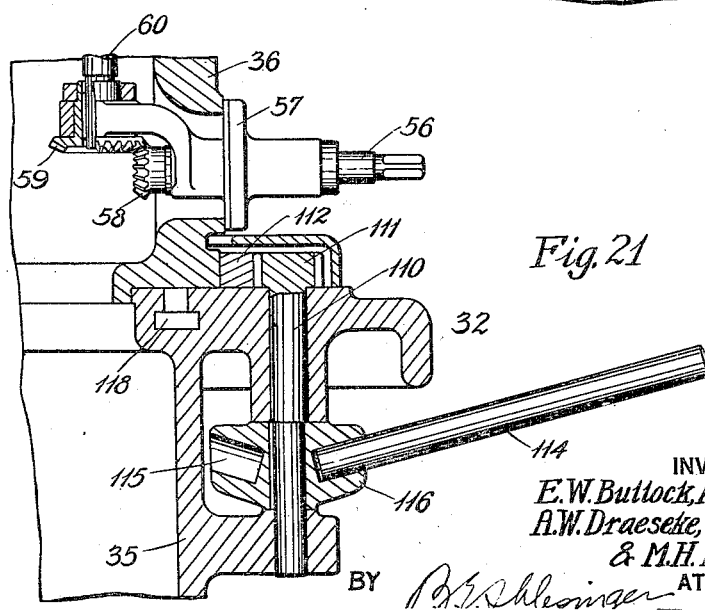

Figure 16 is a fragmentary plan view of the base of the machine, showing the cam or lug for actuating the rod, which releases the work head clamping jaws, into operative position as each work head approaches the loading station and showing, also, the cam for moving the work heads away from and returning them into engagement with their respective tools at the loading station to permit the completed gears to be removed and new blanks put on;

Figures 17 and 18 are a side elevation and a plan view, respectively showing details of the mechanism for releasing the work head locking jaws;

Figure 19 is a fragmentary vertical sectional view of the upper part of the machine showing details of the commutator and of the cutting oil distributing system;

Figure 20 is a side elevational view of the upper portion of the turret, partly in section, showing details of the apparatus for adjusting the tool heads angularly on the turret;

Figure 21 is a fragmentary view showing details of the means for adjusting the upper or tool-carrying part of the turret relative to the lower or work head carrying part of the turret;

Figure 22 is a fragmentary plan view of the base of the machine showing the lubricating oil pump, the control device for the same and the cam for actuating both.

Figure 23 is a side elevation of these parts, portions of the pump being shown in section;

Figure 24 is a section on the line 24—24 of Figure 23;

Figure 25 is a section on the line 25—25 of Figure 26 and Figure 26 is a section taken on the line 26—26 of Figure 25. These figures show details of an alternative arrangement for shutting off the coolant and turning it on again as a work head moves away from its tool and back into an engagement therewith, respectively, at the loading station;

Figure 27 is a vertical sectional view taken through one of the overload relays of the machine;

Figure 28 is a partial sectional view taken at right angles to Figure 27; and

Figure 29 is an electrical wiring diagram of the machine.

The machine illustrated represents a preferred form of the invention as embodied in a machine for roughing longitudinally curved tooth tapered gears. The operation of the machine will be referred to briefly at first and then a detailed description will be given.

In this machine, there are a plurality of face mill cutters and a plurality of work heads mounted on a turret that rotates continuously. The tools also rotate continuously on their respective axes. As the turret rotates around carrying the tools and work heads with it, an alternate movement of feed and withdrawal is imparted to each work head to alternately feed the blank carried thereby into full depth engagement with its tool to cut teeth of full depth on the blank and withdraw the blank from engagement with the tool for indexing. The number of feed and withdrawing movements imparted to a work head as it moves from loading station back to loading station corresponds to the number of teeth required to be cut in a blank so that a gear is cut in one revolution of the turret and as each work head passes the loading station a completely roughed gear may be taken off the machine and a new blank chucked thereon.

The alternate movements of feed and withdrawal are controlled and effected from cams, of which a plurality are provided, one for each work head. The indexing operations are also controlled and effected from cams, of which a plurality are provided, one for each work head. The work spindles are locked against rotation in their respective heads during cutting and the indexing cams operate, in addition to actuating the indexing mechanisms, to release through suitable connections their respective spindles prior to each indexing operation and to actuate the locking mechanisms into locking position again after each indexing operation has been completed. The feed and withdrawal cams and the index cam for each work head are mounted on the same shaft.

At the loading station, each work head is swung away from its respective tool to permit of removal of the completed gear and positioning of a new blank and after the new blank has been put on the head, it is swung back into engagement with its tool and the cycle commences anew. The swinging movements of the work heads are effected by a cam mounted on the base of the machine. With each head swung clear of its tool at the loading station, the operator has plenty of room to take off the completed gear and chuck a new blank without danger of injury to himself or to the work and at the same time the dimensions of the machine do not have to be increased so as to give this abundance of working space.

In the machine illustrated, means is provided whereby the swinging movement of each work head away from and into operative position is employed to actuate the corresponding work chucking mechanism in such way that the chuck is released automatically as the work head moves away and the operator has simply to slip the completed gear off the work spindle and put a new blank on, and the chuck is engaged again as the work head returns into operative position to hold the new blank fast on its spindle.

An additional feature of the machine already referred to is the employment of the swinging movement of each work head to shut off the coolant as the work head moves away from its tool and to turn the coolant on again as the work head returns into operative position.

To prevent pivotal movement of the work heads accidentally while the gear blanks are being operated upon and before the loading station is reached, each work head is securely locked in operative position during the time the blank is being operated upon. The locking mechanism is automatically tripped when the work head reaches a point just ahead of the loading station by a cam secured to the base of the machine so that the head is released just before the roller on the work head comes into operative engagement with the cam which moves the work head away from its tool.

The means for safeguarding the operator against injury and for insuring sufficient time at the loading station to load each new blank is of an electrical nature controlled and operated by the swinging movements of the work heads.

The machine is lubricated automatically and the lubricating oil pump is coupled to an automatic control device which may be set to actuate the pump after such a predetermined variable number of revolutions of the turret as may be determined by experience and the particular job is required to keep the moving parts of the machine adequately and efficiently lubricated without waste.

Each of the tools is angularly adjustable on the turret to permit inclining its axis at any desired angle to the axis of the work. The turret is made in two parts. The work heads are secured to the lower part while the tools are rotatably mounted on the upper part and the two parts are angularly adjustable relative to each other. Removable shim plates are provided for use in adjusting the tools radially of the axis of the turret. The machine can be arranged to cut gears of different spiral angles by either adjusting one part of the turret on the other and shimming the tools or by adjusting one part of the turret on the other and changing the angular setting of the tools.

A separate motor is provided on the turret for rotating each tool. To avoid a poor finish where a tool becomes dull or any possible injury to the motor through an overload, overload relays have been provided, one for each tool motor. They are arranged to stop the machine when through dulling of the tool or any other reason any one of the tool motors becomes overloaded. As an additional feature, the machine is provided with means for indicating which one of the motors has become overloaded. There is a colored button provided with each relay which is normally held concealed but which is released when a relay functions so that by glancing at the buttons the operator can tell immediately which motor was overloaded.

In addition to the other features already enumerated, means are provided for separating the chips from the cutting oil after use so that the cutting oil can be reclaimed and used again.

The principal features of the invention have been briefly mentioned above. Referring now to the drawings by numerals of reference, 30 indicates the base or bed of the machine. On this base is rotatably mounted a turret 32. The turret is centered in its rotary movement by the sleeve 33 (Fig. 1) which is formed integral with it and rotates on the annular bearing 34 which is formed integral with the base 30. The turret is made in two parts, a lower part 35 which serves as a carrier for the work head and an upper part 36 on which the tools are mounted (Figs. 1, 3, 20 and 21). The two parts of the turret are made adjustable on one another for a purpose which will be hereinafter described. They are, however, connected together to rotate as one unit during the operation of the machine. The parts of the turret may be of any desired shape but are preferably made square in the body portions as clearly shown in Figures 2 and 3.

The upper part 36 of the turret carries, in the machine shown, four tools and the lower part 35 of the turret carries a corresponding number of work heads, one tool being paired with each work head and moving together with that work head during the rotation of the turret. It will be understood, of course, however, that any other number of tools and work heads may be employed if desired.

Figure 1:
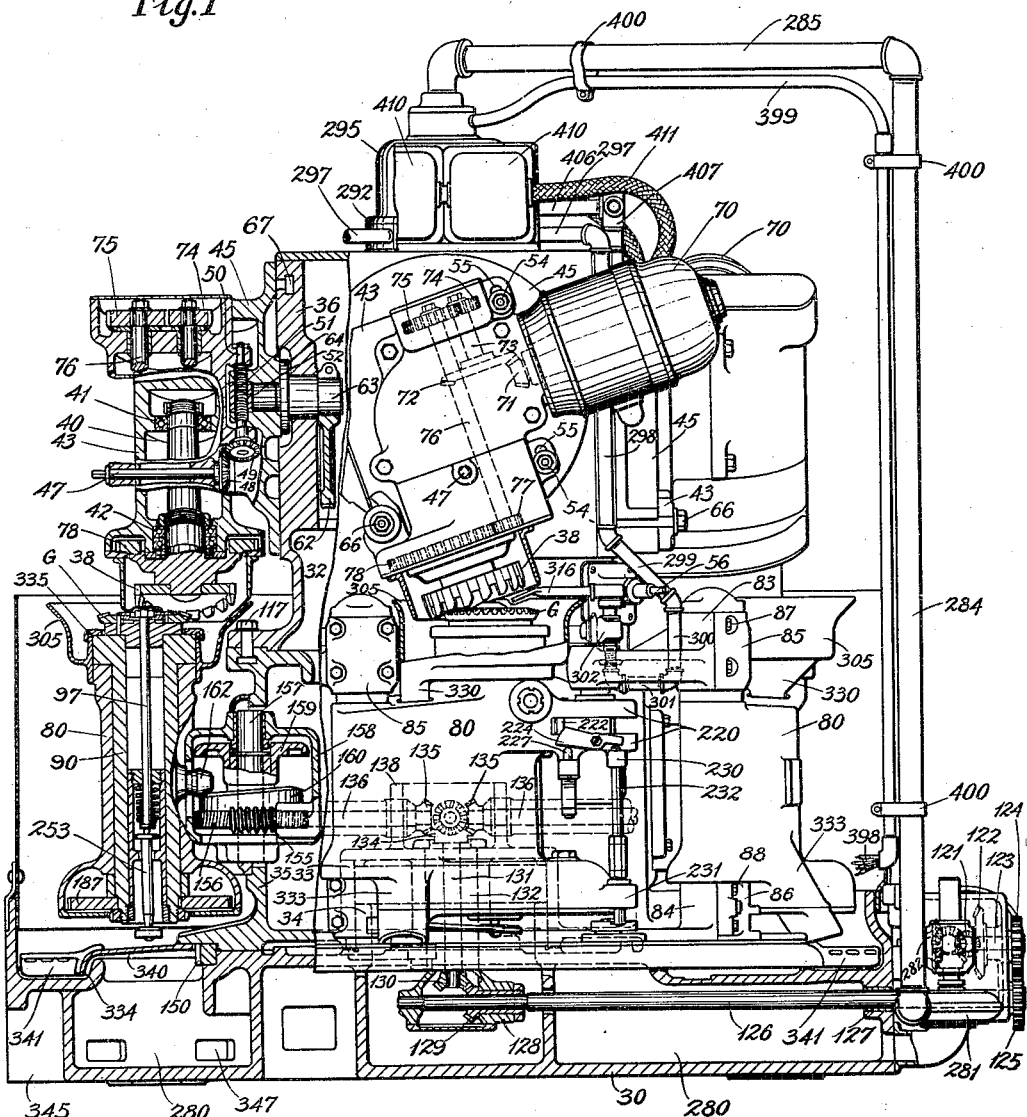
Figure 1 is a side elevation, partly in section, of a machine particularly adapted for roughing spiral bevel and hypoid gears and constructed according to a preferred embodiment of this invention.

The tools are in the form of rotary annular face mills 38 (Fig. 1). Each of the tools is separately adjustable on the upper portion 36 of the turret and each of the tools is driven from a separate motor, the four motors being mounted on the upper portion 36 of the turret. As the drive to each tool, the mounting, and the means for adjusting each tool is the same, the drive, mounting, and adjustment of one tool only need be described specifically here.

Each tool 38 is secured to a spindle 40 that is journaled in suitable anti-friction bearings 41 and 42 in a saddle 43. The saddles 43 are each adjustably mounted upon a plate or shim 45 and the plates or shims 45 are in turn each angularly adjustable upon the upper portion 36 of the turret.

The adjustment of a saddle 43 upon a plate 45 permits of a slight adjustment of the corresponding tool in the direction of its axis. This adjustment may be effected in each case by rotating the shaft 47 as by a wrench. The shafts 47 are each journaled in the respective saddles 43 and each carries at its inner end a bevel gear 48 which meshes with a bevel gear 49 on a screw shaft 50 which is journaled in the saddle 43. Each screw shaft 50 carries a screw 51 which is in threaded engagement with a nut 52, one of which is secured in each plate 45 against movement relative thereto. As will be apparent, rotation of any one of the shafts 47 will move the particular screw 51 controlled thereby in its nut 52 to adjust the corresponding saddle 43 on the corresponding plate 45 to adjust the axial position of a cutter 38. Each saddle 43 can be secured in any adjusted position by means of bolts 54 which pass through slots 55 formed in each saddle 43 and which are secured in the plates 45.

Each plate 45 can be adjusted angularly on the portion 36 of the turret by rotating a stub shaft 56 (Fig. 1, 20 and 21). There is one stub shaft 56 journaled on each of the four brackets 57 secured to the upper turret portion 36. Each of the shafts 56 carries at its inner end a bevel pinion 58 that meshes with a bevel gear 59 secured to a worm shaft 60. Each of the form shafts 60 is journaled in suitable bearings provided in the corresponding bracket 57 and in the upper portion 36 of the turret. Each of the worm shafts 60 carries a worm 61 that meshes with a worm wheel segment 62 which is fixedly secured to a short shaft 63. Each of the shafts 63 (Fig. 1) is journaled in the upper portion 36 of the turret and is provided at its outer end with an enlarged head 64 which is secured in any desired manner, as by means of bolts or screws to the corresponding plate or shim 45. It will be clear, then, that by rotating the shafts 56, the corresponding plates 45 can be angularly adjusted on the upper portion 36 of the turret. This angular adjustment permits of inclining the axis of a tool 38 relative to the axis of the blank upon which the tool operates. Each plate 45 can be secured in any adjusted position on the turret portion 36 by means of a bolt 66 which passes through a slot in the saddle 43 and in the plate 45 and engages in circular T-slot 67 formed in the face of the turret portion 36.

The motors 70 which drive the various tools 38 are each mounted upon the corresponding saddle 43. Each motor 70 drives its tool 38 through a pair of spiral bevel gears 71, 72, the shaft 73 which is journaled in the saddle, the change gears 74 and 75, the shaft 76 journaled in the saddle, the spur pinion 77 and the spur gear 78 meshing therewith which is secured to the head of the cutter spindle 40.

Each of the four work heads which are designated generally at 80 (Figs. 1, 2, 3, 4 and 6) is of the same construction and the movement of each during the operation of the machine is the same so that the construction and movement of one only need be described specifically here.

Each work head 80 has formed integral with it a sleeve 81 that is keyed to a post or trunnion 82 (Figs. 6 and 10). The trunnions 82 are each journaled in bearings 83 and 84 (Figs. 1 and 6) which are formed in the lower turret portion 35. The bearings 83 and 84 are capped by cap pieces 85 and 86, respectively, which are secured by bolts 87 and 88, respectively, to the lower portion 35 of the turret.

Journaled in a suitable bearing formed in each work head is a work spindle 90. Each work spindle 90 is provided at its upper end with an enlarged head 91 (Fig. 6) to which is secured the spacing plate 92. The upper face of each spacing plate 92 serves as a rest for the gear blank G which is to be cut in the operation of the machine. Each blank is centered on the head of its work spindle by a pin 94 which is secured in the spacing plate 92 and is adapted to enter one of a series of holes 95 formed in the gear blank forging.

Each gear blank G is clamped to its spindle 90 during the operation of the machine by a draw bolt 97 to which is secured a three-eared head 98 (Figs. 6 and 8). Each head 98 is adapted to be passed through an opening 99 formed in a clamping plate 100 shaped to conform to the shape of the lugs or ears of the head 98. By turning the plate 99 in one direction, then, the opening 99 in the plate 100 can be brought into register with the lugs or ears formed on the head 98 and the plate 100 slipped off or on the head. By turning the plate 100 so that the lugs or ears of the heads 98 are out of register with the opening formed in the plate, the plate 99 will be held in clamping position to secure the gear blank on the work spindle. The pin 94 already referred to enters the slot 101 formed at one side of each of the plates 100 to limit the movement of the plates 100 with reference to the heads 98 in either direction so that when a plate 100 is turned to the limit of its movement in one or the other direction, the opening 99 in the plate will be in register or out of register with the lugs or ears of the head 98 as the case may be. A cap piece 103 (Figs. 2, 3 and 6) is secured by screws to each plate 99 to prevent entry of dirt or chips into the parts. Figure 8 shows the parts with this cap removed.

Each clamping plate 100 is held in clamping position to grip a gear blank G by a coil spring 105 which is interposed between the washer 106 that is mounted on the draw rod or bolt 97 and a nut 107 which is in threaded engagement with a sleeve 108. The sleeves 108 are mounted in the bores of the several work spindles 90 and are in threaded engagement with the work spindles.

In the machine illustrated, the adjustments required for cutting gears of different spiral angles and tooth depths are adjustments of the tool and no adjustment of the work spindles is provided or required. The angular adjustment of the plates or shims 45 which has already been described and which serves to incline the axis of the tool with reference to the axis of the gear blank to be operated upon may be employed to adjust the taper in depth of the teeth to be cut on the blank. This adjustment may be combined also with a rotational adjustment of the upper portion 36 of the turret on the lower portion 35 of the turret to permit adjusting the tools 38 to cut gears of different spiral angles.

The adjustment of the upper portion 36 of the turret on the lower portion 35 may be effected by rotating the shaft 110 (Figs. 3 and 21) to the upper end of which is secured a spur pinion 111 that meshes with a spur gear segment 112 which is secured to a circular flange formed on the lower part of the turret portion 36. The shaft 110 can be rotated by engaging a bar 114 in one of the four sockets 115 formed in the sleeve 116 which is keyed to the shaft 110.

After the adjustment of the upper portion 36 of the turret on the lower portion 35 has been effected, the two parts are secured together by T-bolts 117 (Fig. 1) which pass through the upper portion 36 and engage in an annular T-slot 118 (Fig. 21) formed in the lower portion 35 of the turret.

Another way to adjust the tools to cut different spiral angles is to adjust the upper portion of the turret on the lower portion in the manner just described and change the plates or shims 45. A number of these plates or shims 45 of different thicknesses may be supplied with the machine so that by changing the plates, the tools can be spaced different distances from the faces of the upper portion 36 of the turret. By combining this adjustment, then, with the angular adjustment of the upper portion of the turret on the lower portion, the tools 38 can be positioned to cut teeth on the gears of any desired spiral angle.

For rotating the turret, a motor 120 (Figs. 2 and 3) is employed. This motor is mounted upon a suitable bracket secured to the base 30 of the machine. The motor 120 drives through a pair of bevel gears 121, 122, (Figs. 1 and 3) a shaft 123. The shaft 123 carries at its outer end a spur gear 124 which meshes with and drives a spur gear 125 that is secured to a shaft 126. The spur gears 124 and 125 form a set of speed change gears governing the speed of rotation of the turret and of operation of the machine. The shaft 126 is journaled in a bearing 127 in the base 30 and in a bracket 128 secured to the base 30 centrally thereof. Secured to the shaft 126 adjacent its inner end is a miter gear 129 which meshes with and drives a miter gear 130 that is fastened to a vertical shaft 131. The shaft 131 is arranged centrally of the turret and is journaled in a sleeve 132 which is formed integral with the bracket 128.

The shaft 131 carries at its upper end a bevel gear 134. Four bevel gears 135 arranged ninety degrees apart and secured to shafts 136 that are arranged at right angles to each other mesh with the bevel gear 134 and are driven thereby. The shafts 136 are journaled at their inner ends in a sleeve 138 secured to the lower portion 35 of the turret and at their outer ends in suitable antifriction bearings 137 mounted in the lower portion of the turret, see Figures 1, 3 and 10. The shafts 136 drive the four cams for imparting to the work heads their alternate movements of feed and withdrawal as will be described hereinafter.

Secured to one of the shafts 136 intermediate its ends (Fig. 3) is a bevel pinion 139 which meshes with and drives a bevel gear 140 that is secured to a shaft 141. The shaft 141 is journaled at its inner end in a bracket 142 mounted on the shaft 136 which carries the pinion 139 and is journaled at its outer end in a suitable bearing provided therefor in the turret. At its outer end the shaft 141 carries a spur gear 144 which meshes with and drives a spur gear 145 that is secured to a worm shaft 146 which is journaled in a suitable bearing provided therefor on the lower portion of the turret. The worm shaft 146 carries a worm 147 which meshes with and drives a worm wheel 148. The worm wheel is secured to a short vertical shaft which is journaled in a suitable bearing in the lower portion of the turret. To the lower end of this shaft is secured a spur pinion 149 and this spur pinion meshes with a large spur gear 150 (Figs. 1 and 3) which is keyed or otherwise fastened to the base 30 of the machine. It will be apparent that as the spur pinion 149 rotates through the drive just described, it will roll on the spur gear 150 and cause the turret to revolve on its axis moving the pairs of tools and work heads from the loading station around the machine and back to the loading station again.

Figure 3:
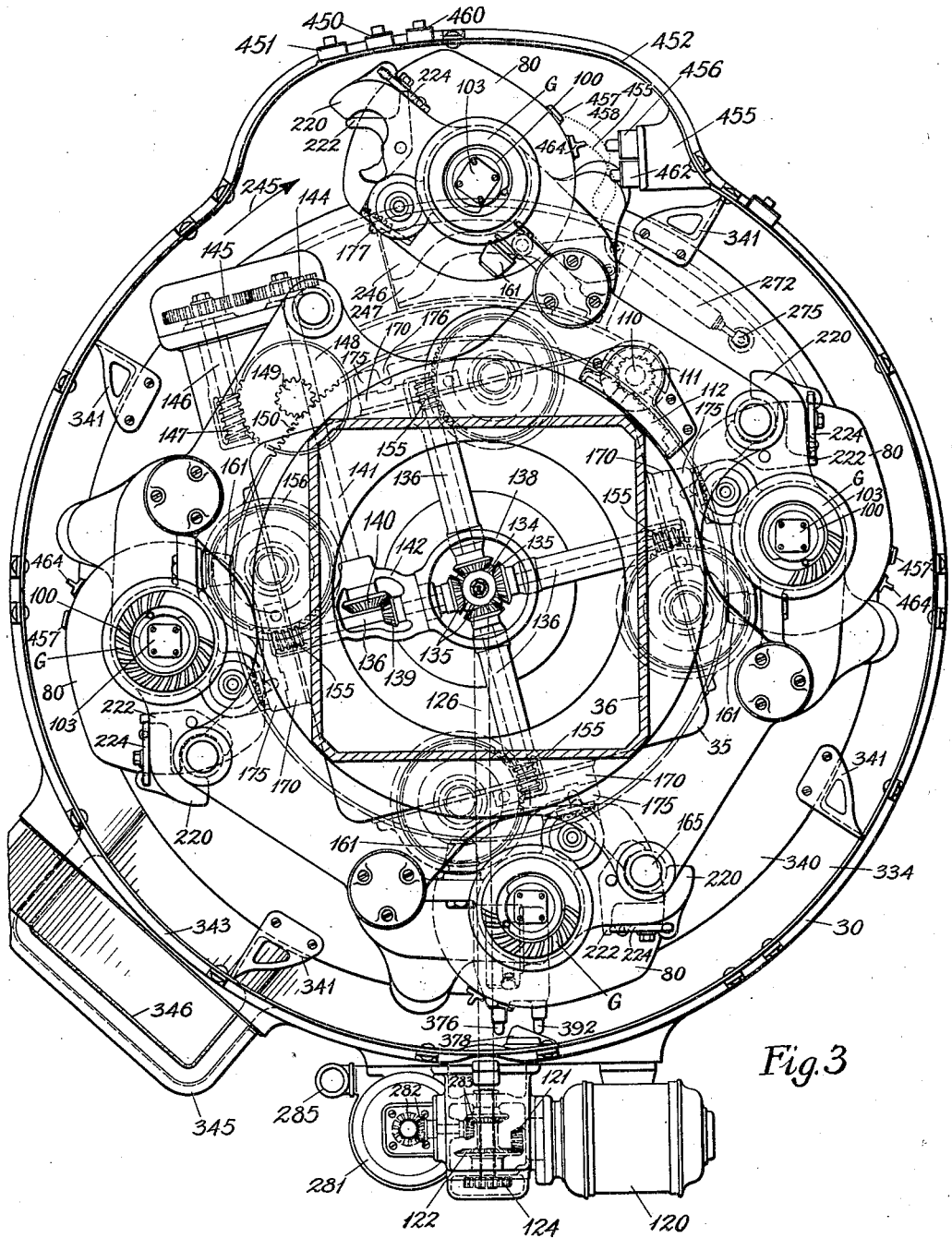
Figure 3 is a horizontal sectional view of the machine taken on a line above the work heads, parts being omitted for the sake of clearness.

The mechanism for imparting to the blank spindles their alternate movement of feed and withdrawal during the rotation of the turret will now be described. Secured to each of the shafts 136 at its outer end is a worm 155 (Figs. 1, 3 and 10). Each of the worms 155 meshes with and drives a worm wheel 156. The worm wheels are secured to cam shafts 157 each of which is journaled in suitable bearings formed in a housing 158. There are four cam shafts and four housings corresponding to the number of work heads.

Each of the cam shafts 157 has secured to it a pair of cams 159 and 160. The cams 159 govern the indexing movement of the several work spindles while the cams 160 govern the feed and withdrawal movements of the several work heads. The several cams 159 and the several cams 160 are changeable so that the extent and frequency of the feed and withdrawing movements and of the indexing movements, respectively, may be changed as desired conformable to the character and number of teeth required to be cut upon each gear blank during a revolution of the turret.

The cam 160 is preferably shaped to impart a movement of feed and withdrawal to the corresponding work head 80 for each rotation of the cam. For securing this motion there is fastened to each work head 80, by a stud or bolt 161, a roller 162 (Figs. 6 and 10) which is in engagement with the corresponding cam 160. The alternate movements of feed and withdrawal are in the direction of the axis of the blank, that is, in the present case the work heads are moved vertically. Each work head is guided in its alternate movement of feed and withdrawal by the sleeve 81 which slides vertically on the post or trunnion 82 and by the gripping jaws which secure the work heads in operative relation with their respective tools, as will be described more particularly hereinafter, and which in each case engage a sleeve 168 that slides vertically on a bar or rod 165 which is held in lugs 166 and 167 (Figs. 6 and 10) secured to the lower portion 35 of the turret.

The mechanism by means of which the indexing of the work spindles is effected from the cams 159 will now be described. Reciprocably mounted in each of the cam housings 158 is a bar 170. Each of the bars 170 carries at its inner end a roller 171 (Figs. 10, 11 and 3) which engages in the cam slot 174 of the corresponding cam 159. Secured to each of the bars 170 is a plate 175. Each of the plates 175 is recessed at 176 to receive a lug or finger 177 formed on the rear face of a rack 178. The racks 178 slide in suitable guide ways formed in the several work heads 80 and are mounted for swinging movement with the work heads away from the turret. Each of the racks 178 meshes with a spur gear 180 that is secured to a vertical shaft 181.

Figure 14:
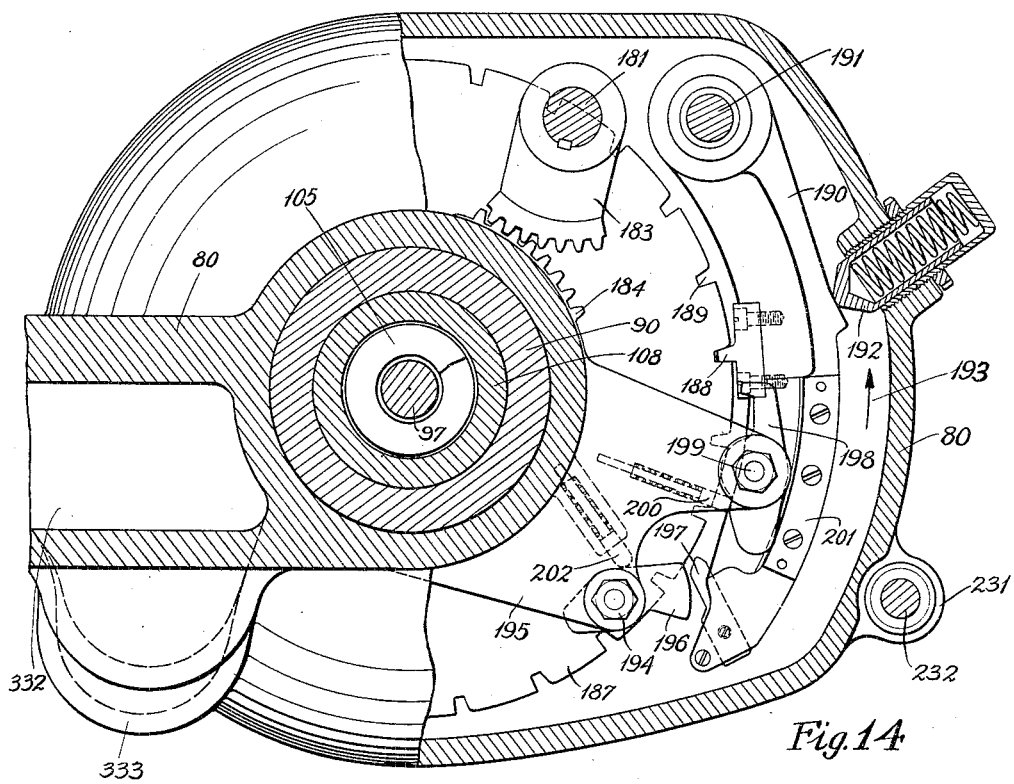
Figure 14 is a section on the line 14—14 of Figure 6 with part of the work head guard broken away to show details of the index mechanism.

Keyed to each shaft 181 adjacent its lower end is a spur gear segment 183 (Fig. 14). Each spur gear segment 183 meshes with a spur gear segment 184 which is secured to or formed on a sleeve 185 that is journaled on the work spindle 90 (Figs. 6, 7 and 14) coaxially thereof.

Keyed to the lower end of each work spindle 90 (Figs. 6, 7, 14 and 15) is a notched index plate 187. The plates 187 are provided with a number of notches equal to or a multiple of the number of teeth to be cut in the gear blanks. During feeding and cutting, the work spindles 90 are held against rotation in their respective work heads by engagement in each case, of a locking dog 188 with one of the notches 189 of the index plate 187. The locking dog 188 is carried, in each case (by a lever arm 190 that is pivoted on a stud 191 which is secured in the housing or guard formed on the lower end of each work head and surrounding the respective index plates. Each lever 190 is normally pressed into position to cause the dog 188 to engage a notch of the index plate by means of a spring pressed plunger 192 suitably housed in the head 80 as shown in Fig. 14.

Figure 15:
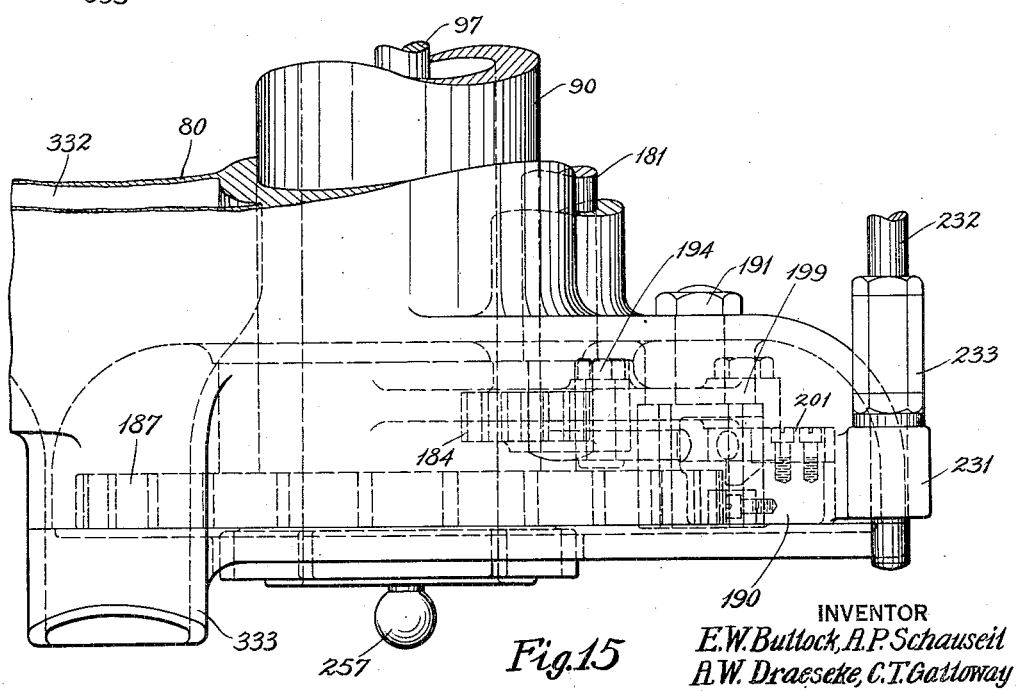
Figure 15 is a fragmentary side elevation, showing the lower part of a work head and further illustrative of the index mechanism.

The slot 174 of each cam 159 is so formed that there is a dwell during feeding and cutting. As soon as the blank has been withdrawn, however, the cam causes a movement of the corresponding bar 170 to move the corresponding rack 178. The movement of each rack 178 rotates the corresponding shaft 181 through engagement of the spur gear 180 carried by the shaft with the rack 178. The rotation of the shaft 181 rocks the gear segment 183 moving the sleeve 185 on the work spindle 90. Pivoted on a stud 194 mounted in an arm 195 formed on each sleeve 185 is a cam piece 196 (Figs. 14 and 15). As the arm 195 moves in the direction of the arrow 193 (Fig. 14) the cam piece 196 engages a bar 197 secured to the lever arm 190 forcing the lever arm 190 outwardly against the resistance of the spring pressed plunger 192 and lifting the locking dog 188 out of engagement with the notch 189 of the index plate 187 with which it has previously been engaged. Pivoted on a stud 199 on the arm 195 is a pawl 198. A spring pressed plunger 200 housed in the arm 195 engages the tail of this pawl and serves to constantly urge the pawl into a position where it can engage with a notch of the index plate 187. The pawl 198 is, however, held out of engagement with the index 187, as long as the locking dog 188 is engaged with the index plate, by a cam formed on a piece 201 which is secured to the lever arm 190. As soon as the dog 188 is withdrawn from a notch in the index plate 187, however, by engagement of the cam 196 with the lug 197, the pawl 198 is free to drop into and engage a notch 189 of the index plate. In the further movement of the arm 195 in the direction of the arrow 193 in Fig. 14, the pawl 198 engages with that notch 189 of the index plate from which the dogs 188 has been withdrawn and the index plate and the work spindle 90 to which the index plate is secured are then ratcheted around by the pawl 198 through an angular distance equal to the distance between two successive tooth spaces to be cut on the blank or a multiple thereof to thereby index the blank. At the end of the indexing movement, the arm 195 has moved so far that the cam 196 has cleared the lug 197 and the lever arm 190 is therefore forced forward again under actuation of the spring pressed plunger 192 to disengage the pawl 198 and engage the locking dog 188 with a new notch of the index plate. Thereafter, the direction of movement of the rod 170 and the rack 178 is reversed by the cam 159, reversing the direction of movement of the shaft 181, the segment 183 and the arm 195 and returning the parts to original position. In this return movement of the arm 195, the cam 196 is depressed by the lug 197 against the action of the spring pressed plunger 202 which is housed in the arm 195 thereby permitting the cam 196 to pass freely under the lug 197 without disengaging the locking dog 188 from the index plate.

The locking dog 188 and index plate 187 serve, of course, not only to properly space the teeth to be cut in the gear blank but to lock the blank and blank spindle against movement during cutting. To prevent any possibility of rotation of the blank spindle during cutting, however, it has been thought advantageous to add a supplementary auxiliary locking mechanism. This comprises, in each case, the two blocks 205 and 206 (Figs. 10, 12 and 13) which are mounted in a recess or hole bored in each work head 80. Each of the blocks 205 and 206 have a portion of one face curved on an arc to engage the periphery of the corresponding work spindle 90. Journaled in the blocks 205 and 206 in each case, is a shaft 207 to which is threaded at one end a nut 208. The nut 208 serves to hold a washer 209 in position and between this washer and the block 206 is mounted a thrust bearing 210. Secured to the shaft 207 at its inner end is a bevel gear 212. This bevel gear 212 has formed on its inner face a series of beveled or tapered lugs 213 (Figs. 12 and 13). Each of the blocks 205 has formed on its outer face oppositely beveled or tapered lugs 214 which are adapted to cooperate with the beveled or tapered lugs 213 formed on the corresponding bevel gear 212. It will be seen that as the bevel gear 212 is rotated in one direction the two blocks 205 and 206 will be forced together to clamp the work spindle 90 against rotation in the work head and that when the bevel gear 212 is rotated in the opposite direction the blocks 205 and 206 will be released and the work spindle 90 will be free to rotate the work head. The blocks 205 and 206 will be moved by the bevel gear 212 and held by the same in clamping position during cutting, while the blocks 205 and 206 are released when the work spindle is to be indexed. The bevel gear 212 is moved alternately as required in opposite directions by a bevel gear 215 which meshes therewith and which is secured to the shaft 181 at the upper end thereof. The shaft 181 is of course oscillated from the cam 159 through the train of gearing previously described. Hence, as the shaft 181 moves in one direction to move the arm 195 to disengage the locking dog 188, it will simultaneously release the blocks 205 and 206 and as the shaft 181 moves in the opposite direction and the dog 188 re-engages the notched plate 187, the blocks 205 and 206 will be forced into clamping engagement with the work spindle 90.

The alternate operations of cutting and indexing take place repeatedly as each work spindle rotates with its cutter about the axis of the turret so that when each work spindle reaches the loading station, the required number of teeth will have been cut on the blank. As each work head comes successively to the loading station it is swung about the axis of the corresponding post or trunnion 82, to permit the operator to take the completed gear off the work spindle and put on a new blank. The mechanism for effecting this swinging movement will be described later. To prevent movement of the work head while the gears are being cut and before the loading station is reached, each work head is locked in operative position until positively released for outward movement at the loading station. The mechanism for securing the work head in operative position will now be described.

As this mechanism is identical for each work head, the description of one only need be referred to specifically.

Mounted as previously described, in a pair of brackets or lugs 166 and 167 secured to the lower portion 35 of the turret is a rod or bar 165 (Figs. 6 and 10). There is one rod or bar for each work head. Each work head is formed at one side with a pair of fixed jaws 220 (Figs. 1, 2, 3, 4, 6 and 10). Pivotally mounted between these jaws 220 on a taper pin 221 is a movable jaw 222 (Figs. 3, 6 and 10). The jaws 220 and 222 of each set are adapted to cooperate and grip the corresponding sleeve 168, to prevent pivotal movement of the corresponding work head about the axis of the trunnion 82.

The movable jaw 222 is normally held in locking engagement with the sleeve 168 by a pivoted lever 224 which is pivoted on a stud 225 that is threaded into the lower of the jaws 220, a spring-pressed plunger 227, which is suitably housed in an extension of the jaw 220, normally pressing the long arm of this lever 224 upwardly to engage the outer end of this arm with one arm of the movable jaw 222 to hold the jaw in locking position. The outer face of the arm 224 is preferably formed on a curve of increasing radius to have a wedging action on the jaw 222 as it moves upwardly to force the jaw thereby more readily into clamping position. While the fixed jaws 220 and movable jaw 222 engage the sleeve 168, the sleeve itself has a sliding fit on the rod 165 so that the jaws can move vertically up and down during the alternate feed and withdrawal movements of the corresponding work head. The jaws 220 and 222 and sleeve 168, hence, cooperate with the sleeve 81 to guide the corresponding work head in its alternate vertical up and down movements.

The mechanism for tripping and releasing the work head locking mechanisms successively as each approaches the loading station will now be described. Reciprocable in a lug 230 (Figs. 1 and 6) integral with each of the lower fixed clamping jaws 220 of each work head and in a lug 231 integral with each work head is a rod 232. A nut 233 threaded on each rod 232 prevents the rod from dropping out of the lugs 230 and 231 and at the same time causes the rod to move with its work head during the feeding movement of the work head. The rod normally moves with the work head also by gravity on the withdrawing movements of the head. In normal position, the upper end of the rod is spaced a slight distance from the tail or shorter arm of the locking lever 224, as clearly shown in Fig. 6. Secured to the base 30 of the machine is a cam or lug 235 (Figs. 16, 17 and 18). Secured to a circular flange formed on the lower portion 35 of the turret as by means of screws 236 are four brackets 237, spaced 90° apart, one for each work head. Journaled in each bracket is a stud 238, provided at its lower end with a roller or lug 239 and at its upper end with an arm or cam plate 240. Each cam plate 240 is provided with a cam or beveled portion 241. The cam plate 240 is held on the stud by the washer 242. Each of the rollers 239 has a flat or slabbed-off side as indicated at 239' in Figure 18.

In each feed movement of the work head the corresponding rod 232 moves vertically upward with the work head. In the last feed movement of each work head, as the last tooth space is being cut in the blank carried by the work head, the turret has rotated far enough to bring the corresponding lug or roller 239 into engagement with the lug or cam 235 which is secured to the base 30 so that in the further movement of the turret the flat side 239' of the roller 239 strikes the lug 235 and the lug or roller 239 is turned to rotate its shaft 238 on its axis and turn the cam plate 240 to bring the arm 241 thereof beneath the lower end of the rod 232 which is then with the work head in its upper or feed position. In the subsequent withdrawal movement of the work head, which is the last withdrawal movement, the gear blank having been finished, the head is withdrawn from engagement with its tool as usual but the rod 232 is held in its upper position by the cam plate or arm 240. Due to this relative movement between the rod 232 and the head, the upper end of the rod is brought into engagement with the short arm of the lever 224 (Figs. 1 and 6) turning the lever 224 about is pivot 225 against the resistance of the spring-pressed plunger 227 and releasing the movable gripping jaw 222, thus freeing the work head for its subsequent pivotal movement about the axis of the post or trunnion 82.

Figure 2:
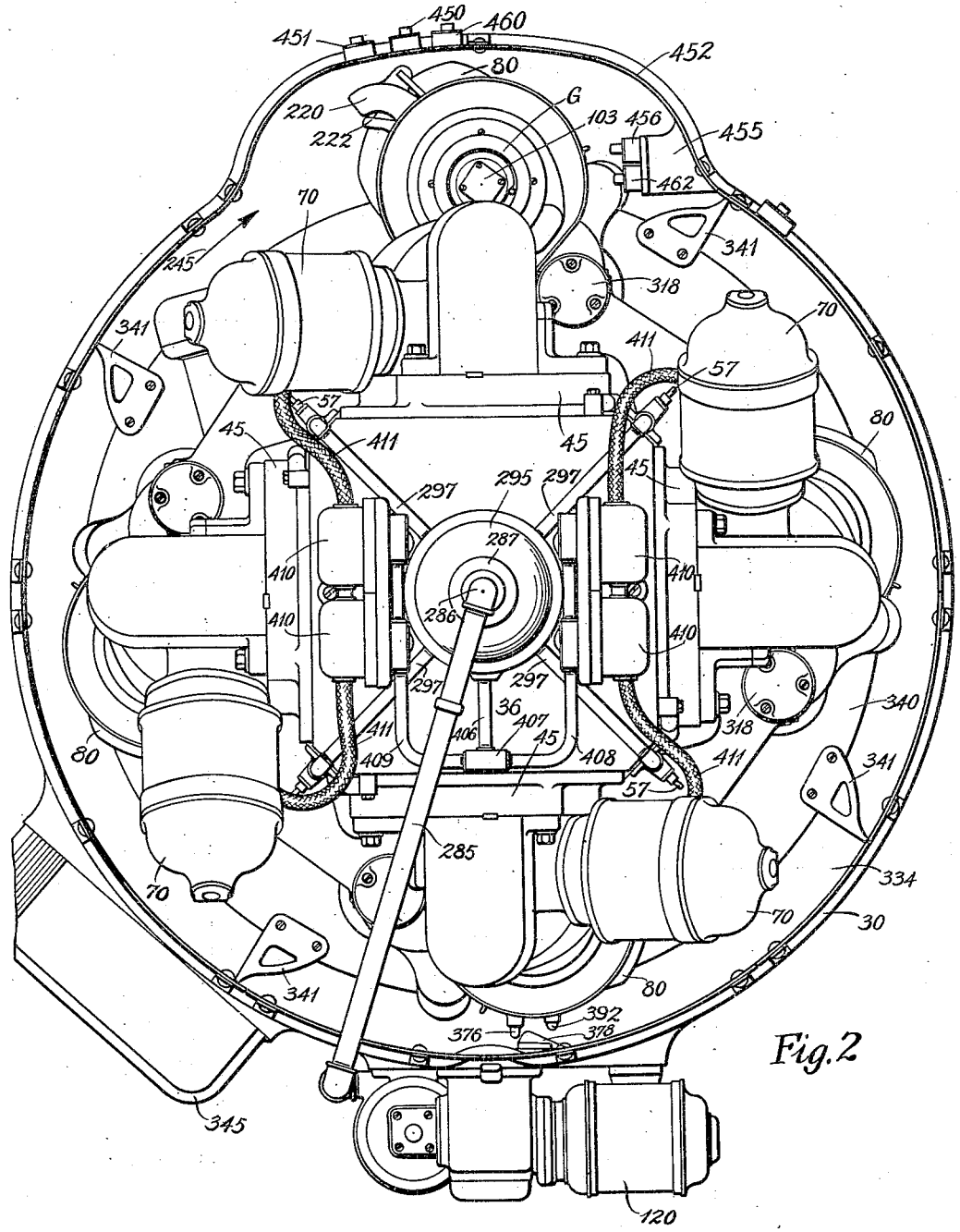
Figure 2 is a plan view of this machine.

The mechanism for swinging each work head successively away from its respective tool as each approaches successively the loading station will now be described. Secured to each post or trunnion 82 at the lower end thereof (Fig. 6) is an arm 243. Each arm carries a roller 244. Secured to the base 30 of the machine at a point beyond the cam or lug 235 considered in the direction of rotation of the turret which direction is indicated by the arrow 245 in Figs. 2, 3 and 16, is a cam plate 246 (Figs. 3 and 16). The groove 247 of this cam 246 is formed with a portion 248 for swinging the work heads successively away from their respective tools, with a dwell 249 during which the work head remains in its outer position to permit removal of the completed gear and with a return portion 250 for swinging the work head back into operative relation with its tool, as clearly shown in Fig. 16. After the locking mechanism of each work head has been tripped by its rod 232, the roller 244 corresponding to that work head enters the track 247 of the cam plate 246 causing the work head to swing outwardly about the axis of the corresponding trunnion 82 as its roller 244 moves in the track through continued rotation of the turret. This outward swinging movement carries the work head entirely clear of its tool without requiring any increase in the dimensions of the machine and the operator can readily take off of the work head the completed gear and put on a new blank.

To relieve the operator of the necessity of releasing the chucking mechanism manually and hence speed up the production of the machine, means is provided whereby the outward swinging movement of each work head automatically releases the corresponding chucking mechanism. Each of the draw rods 97 (Figs. 1, 6 and 7) is urged by its spring 105 downwardly to hold the blank chucked, and to force the inner headed end of the draw rod constantly into contact with a ball 251 which is mounted in the mushroom head 252 formed on a stem or stud 253 that is mounted for rocking or tilting movement in the sleeve 108 secured to the work spindle. Each mushroom head 252 seats on a washer 254 which in turn seats on a flange 255 formed in the sleeve 108 midway of its length. The lower end of each stem or stud 253 is provided with a ball head as indicated at 257. The ball head 257 of each stud 253 seats in a slot 258 formed in a lever arm 259 which has a universal joint connection with the corresponding work head trunnion cap plate 86. This connection comprises a pin 260 which pivotally connects a pair of ears 261 formed on the lever arm 259 with a stud 262 which is pivotally mounted between two ears 264 formed on the lower bearing cap plate 86 for the post or trunnion 82.

The mounting of the stud 262 is eccentric of the post or trunnion 82. Consequently as each work head moves successively outwardly through engagement of its roller 244 with the cam 246, the stud or stem 253 will be rocked or tilted by the lever arm 259 from a position of alignment with the draw bolt 97 (Fig. 6) to a position at an angle to the draw bolt 97 (Fig. 7) forcing the draw bolt upwardly against the resistance of the spring 105 releasing the clamping plate 100 and the completed gear G, so that when the work head has moved clear of its tool, the operator has simply to turn the clamping plate 100 to bring the slot 99 (Fig. 8) in the clamping plate into register with the lugs or ears of the draw-rod head 98 and slip the clamping plate off of the head to remove the completed gear G. This done, the operator puts a new blank on the work head centering it by means of the pin 94, puts the clamping plate 100 back on the head and turns it to engage it with the lugs or ears of the draw-rod head 98. The removal of the completed gear and chucking of a new blank all must be accomplished while the roller 244 is moving in the outward dwell portion 249 of the cam path 247. When the roller 244 strikes the return portion 250 of the cam path 247, the new blank must have been chucked.

In the return movement of the work head, the lever arm 259 (Figs. 6 and 7) pivots relative to the work head moving the stem or stud 253 back into alignment with the draw rod 97 and allowing the spring 105 to act to force the draw rod 97 downwardly clamping the newly chucked blank securely on the plate 92 and work spindle 90.

In the outward movement of the work head, the rod 232 (Figs. 6, 17 and 18) slips off the corresponding cam plate 240 into the position shown in Figs. 17 and 18. Consequently in the return movement of the work head the rod 232 will strike the cam plate 240 and rock the cam plate out of the way so that when the head has returned into operative position the rod 232 will be spaced by gravity below the short arm of the lever 224 and the spring pressed plunger 227 (Fig. 6) can act to force the lever 224 and swinging jaw 222 into locking position and hold them there while the newly chucked gear blank is being cut.

To prevent any possibility of damage to the machine through possible binding of the roller 244 in the return portion 250 of the cam path 247 during the return movement of the work head, the outer wall provided on the cam plate 246 defining the cam path is terminated at the end of the dwell 248 in the cam path and a pivoted plate 270 (Fig. 16) is provided instead to hold the roller 244 in the cam path in the return movement. This plate 270 is pivoted on a stud 271 secured to the base 30 of the machine and is resiliently pressed inwardly about its pivot by a device comprising a cylinder 272 which is pivotally connected at 273 with the plate 270, a rod 274 reciprocable in the cylinder and pivotally connected at 275 with a stud mounted on the base 30, and a spring 276 mounted on the rod and held between the shoulder formed internally in the cylinder and an adjustable nut secured to the rod. Through this mounting, the plate 270 will yield sufficiently to prevent binding and at the same time serves to keep the roller 244 moving in the cam path 247 to return the work heads to operative position.

In gear cutting machines it is customary to pump a coolant, as a cutting oil, continuously onto the blank at the point where the cutting is taking place to prevent heating up of the blank and consequent possible distortion thereof and also to prevent injury to the cutting tools. In the present machine, the coolant is pumped to each of the four work heads. To prevent wasting or spattering of the oil as each work head moves clear of its tool at the loading station, means is provided for automatically shutting off the cutting oil supply to each work head when they move outwardly at the loading station. This means is constructed, also, to automatically turn the cutting oil on again and when the work head has been moved back into cutting position with the new blank chucked thereon. Two different possible constructions of such a mechanism are illustrated in the drawings, one in Figs. 4 and 5 and the other in Figs. 25 and 26. The mechanism of Figures 4 and 5 will be described first.

In the use of either construction, the cutting oil is pumped from a sump or reservoir 280 (Fig. 1) provided in the base 30 by means of a suitable pump as the centrifugal pump 281 which is driven from the motor 120 (Figs. 1 and 3) by two sets of bevel gears 282 and 283, respectively, which connect the pump with the shaft 123. The cutting oil is forced by the pump 281 through a vertical pipe 284 secured to the machine and through a horizontal pipe 285 that extends above the machine into an elbow 286 (Figs. 2 and 19). The elbow 286 is threaded into a cap 287 which is secured by bolts 288 to a trunnion or bearing 289. Threaded into the cap 287 is a pipe 290 (Fig. 19) which conveys the coolant downwardly into a receptacle 291 formed in an annular ring member 292. This annular ring member is secured by means, not shown, to the cover plate 293 of the upper turret portion 36 (Figs. 1, 19 and 20) and by bolts 294 to a housing or drum 295 which rotates on the trunnion or bearing 289. The annular member 292 is formed with four conduits or sleeves 296 spaced 90° apart and into each of the sleeves is threaded a pipe 297. The pipes 297 conduct the oil into pipes 298 (Fig. 1) whence it flows through pipes 299, 300 and 301 to the four control valves corresponding to the four work heads.

Figure 4:
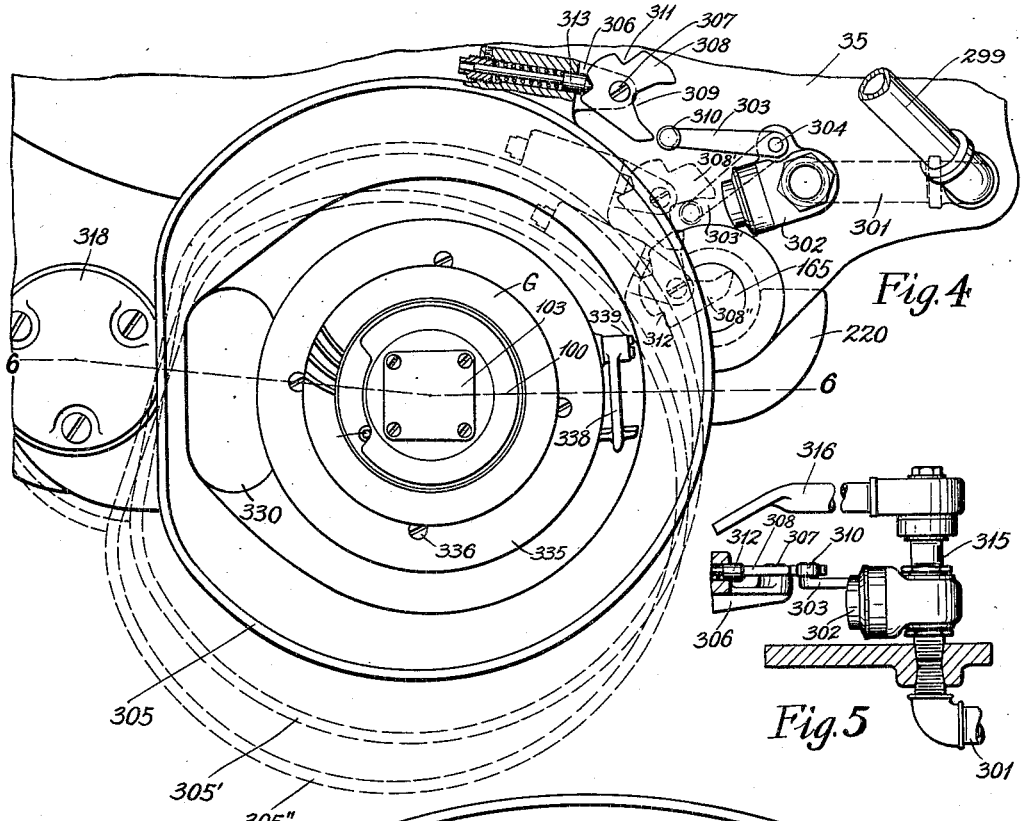
Figure 4 is a plan view of one of the work heads of the machine and associated parts, showing particularly one form of mechanism for shutting off and turning on the coolant, respectively, as a work head moves away from and back into operative position at the loading station.
Figure 5:
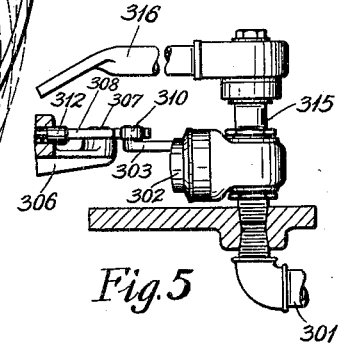
Figure 5 is a side elevation of the coolant control mechanism illustrated in Figure 4.

In the case of the mechanism illustrated in Figs. 4 and 5, the cutting oil is conducted by each pipe 301 into a valve chamber 302. The four valve chambers 302 are mounted on the lower portion 35 of the turret. The valves which may be of any suitable construction are each controlled by an arm 303 which is pivotally mounted at 304 on the chamber. In this case, the guards 305 which surround each work head at their upper ends are each provided with an extension or lug 306. On each lug 306 is pivotally mounted at 307 a plate 308. Each plate 308 is formed with a jaw portion 309 adapted to engage a roller 310 which is secured to the outer end of the corresponding arm 303. Each plate 308 is provided with peripheral notches 311 and 312.

In a bore formed in the extension 306 is a spring-pressed plunger 313. This plunger 313 is provided with a tapered outer end which engages alternately in the notches 311 and 312 of the plate 308. When the work head is in operative position, the plunger 313 is engaged with the notch 312.

As the work head moves outwardly at the loading station through engagement of the roller 244 with the cam path 247, the corresponding plate 308 will move with the work head so that its jaw 309 engages the roller 310 of the valve arm 303 and in the further movement of the work head to the first dotted line position indicated at 305′ in Fig. 4, the plate 308 moves to the position 308′ moving the valve arm 303 to the dotted line position 303′ and shutting off the cutting oil supply to that particular work head so that the oil is not wasted or spattered. The position 303′ of the valve arm is the limit position of its movement in one direction. Consequently in the further movement of the work head to the second dotted line position 305″ shown in Figure 4, the plate 308 must swing on its pivot 307.

As the plate 308 swings on its pivot, the plunger 313 is forced out of engagement with the notch 312 and drops into engagement with the notch 311 so that when the work head has moved to the dotted line position indicated at 305″ in Fig. 4, the plate 308 will have moved to the dotted line position 308″ clear of the roller 310.

As the work head returns into operative position with the new blank positioned thereon, the plate 308 engages the roller 310 of the valve arm 303 again and moves this arm from the dotted line position 303′ to the full line position indicated at 303, turning on the coolant again. The full line position indicated at 303 is at the limit of movement of the arm in one direction so that in the further inward movement of the work head, the plate 308 is again forced to swing on its pivot 307 forcing the plunger 313 out of the notch 311. As the head moves further in, the plate 308 again clears the roller 310 and the plunger 313 again moves into engagement with the notch 312 to hold the plate 308 in the full line position shown at 308 in Fig. 4.

The coolant flows from each valve chamber 302 into a pipe 315 and thence into a nozzle 316 which directs it onto the corresponding gear blank at the correct angle to flood with a cooling oil that part of the blank which is being cut by the corresponding tool.

In the alternative arrangement shown in Figures 25 and 26, each pipe 300, Fig. 1, for instance, would be connected by a suitable connection 317 with a cap 320 which is secured by bolts 321 to the bearings 83 for the post or trunnion 82. This cap 320 would be substituted for the trunnion bearing cap 318 (Fig. 6) used if the mechanism of Figures 4 and 5 is employed. The cap 320 is provided with a chamber in which is housed a taper valve 322 which is connected by a pin 323 with the corresponding post or trunnion 82 for rotation therewith. The valve 322 is provided with a right angle bore 325. When the work head is in operative position this bore registers with a bore 326 in the cap 320 permitting the coolant to flow from the connection 317 through the valve and into an elbow 328 which is connected by piping in any suitable manner with a nozzle 316. With this mechanism, as the work head swings outwardly, the trunnion 82 rotates in the bearing 83 and rotates the valve 322 in the cap 320 shutting off the coolant. On the return movement of the head, the valve 322 is moved back into open position and the coolant supply is turned on again.

Either arrangement, and other modifications of the invention are possible, will prevent wastage of the cutting oil and spattering of it and a further advantage is that with one of the valves turned off a greater pressure will be built up in the pipes supplying the other three work heads thereby making the coolant system more efficient and supplying a greater force of oil to more readily wash away the chips cut from the three gears which are being operated upon.

The cutting oil after use is carried off through a down spout 330 formed on each work head guard 305 (Figs. 1, 4 and 6). From the down spout 330, the coolant flows through an opening 332 (Figs. 10, 14 and 15) formed in each work head casting 80 and from this opening, the oil flows through the spout 333 also formed integral with the work head casting 80 (Figs. 1, 14 and 15) onto the oil pan or well 334 (Figs. 1, 2, 3, 22 and 23) which is formed integral with the base 30 of the machine.

The flow of the cutting oil over the blank acts not only as a coolant but to wash away the chips formed in cutting the blank. These chips are of course washed with the oil down the spouts 330 into the openings 332 and thence through the spouts 333 onto the oil pan 334. To assist in keeping the work head clear of chips, there is a cap plate 335 secured to each work spindle (Figs. 4 and 6) as by means of bolts 336 and on each cap plate is secured a wiper 338 (Figs. 4, 6 and 9) which is secured to the plate 335 by a screw 339. The wiper 338 rotates step by step with the work spindle 90 in the indexing movement of the work spindle and hence makes a complete revolution once in the cutting of a gear, sweeping the chips before it out of the trough of the guard 305 and into the down spout 330 whence they are washed by the cutting oil onto the oil pan 334.

Secured to the circular skirt 340 of the lower turret portion 35 (Figs. 1, 2 and 23) are a plurality of wipers 341 which serve as the turret rotates to sweep the oil and chips through an opening formed on the flange of the base 30 into a box 345 which is secured to the base 30. This box is provided with a separator in the form of a perforated receptacle 346 which is removable from the box. The oil can flow through the perforations of the receptacle 346 back into the reservoir or sump 280 through openings 347 in the base, while the chips remain in the receptacle which can be removed by the operator periodically for cleaning.

The machine is lubricated automatically. To prevent wasting of the lubricant or flooding of the parts, the lubricating oil pump is controlled from a device which permits of its being actuated periodically only after a predetermined number of revolutions of the turret have taken place, the number of these revolutions being determined by experience to insure an adequate but inexcessive oil supply. The control device may be of any suitable construction. That shown is of the type described in the patent to Maxwell H. Hill, No. 1,577,121, March 16, 1926.

This control device which is mounted on the turret includes a member which is connectable to the pump to prevent actuation of the same and which is advanced step by step with each revolution of the turret until it reaches a predetermined point determined by its initial setting. Then the pump, which is also mounted on the turret is released, a cam on the base then actuates the pump which is immediately locked up again by the control device to remain locked until the predetermined number of revolutions of the turret have again taken place.

The control device designated at 350 (Figs. 22, 23 and 24) is mounted on a bracket 349 secured to the skirt 340 of the turret and may be set by rotation of the knurled nut 351, which is a part of the control device above referred to, to be tripped after any desired variable number of rotations of the turret. The lubricating oil pump, which is also mounted on the bracket 349, is designated generally at 352. The control device is provided with a plunger 354 which is reciprocated once in each revolution of the turret to impart a step by step movement to the control mechanism.

The pump 352 may be of any suitable construction but is preferably of the plunger type. The pump shown is provided with a housing 356 in which is encased a sleeve 357. Secured in the upper portion of the sleeve 357 is a second sleeve 358. A plunger 359 reciprocates in the sleeves 357 and 358. The sleeve 358 is constructed to form a chamber 360 into which the lubricating oil is drawn by suction on the down stroke of the piston or plunger 359 and out of which the oil is forced on the up-stroke of this piston. The oil is prevented from leaking out of the chamber 360 along the plunger by means of a suitable packing 362 which is held in position by the nut 363. The plunger 359 is provided with a collar or flange 363 and between this and the lower end wall of the sleeve 357 is a coil spring 364. The plunger 359 is normally held in its lowermost position, as shown in Fig. 23, against the resistance of the spring 364 by a finger 365 which engages over the collar 363 of the plunger. The finger 365 is formed on the arm 366 which is pivotally mounted between the ears 367 formed on the pump casing 356 and is held normally in engaging position with the plunger collar 363 by the spring pressed plunger 368 which is suitably housed in the pump casing. The finger 365 is adapted to be tripped from engagement with the plunger head by a pin 369 which is connected to the control device 350. When the control mechanism is tripped after the predetermined number of revolutions of the turret have taken place, the pin 369 is thereby automatically moved downwardly in the arcuate slot 370 of the pump casing to engage the arm 366 and rock the finger 365 out of engagement with the plunger collar 363. Immediately the coil spring 364 acts to force the plunger upwardly into the oil chamber 360 forcing the oil out of that chamber through the piping 372 thence through suitable piping to the pipe 373 into the pan 374 (see Fig. 19) formed in the cover 293 of the turret portion 36. From this pan 374, the oil flows through suitable piping (not shown) to the various parts of the machine which require lubrication.

The plunger 354 of the control mechanism is reciprocated each time the turret makes one revolution by engagement of a plunger 376, which is slidably mounted in the bracket 349 on which the control device is mounted, with a cam or lug 378 which is secured to the flange or skirt of the base 30. The inner end of this plunger 376 engages and rocks a lever 382, which is pivoted at 383 on an arm 384 secured to the bracket 349 so that when the plunger 376 is moved inwardly by contact with the cam 378 the lever 382 is rocked about its pivot 383. The upper arm of this lever 382 engages the control mechanism plunger 354 so that each time the lever 382 is rocked the plunger 354 is pushed inwardly to impart a step by step movement to the control mechanism. The plunger 354 is forced outwardly after each impulse by means internal of the control device 350 and in its outward movements acts to rock the lever 382 about its pivot and so return the plunger 376 to outer position.

The plunger 359 is secured to a rack bar 390. This rack bar meshes with a spur gear 391 which in turn meshes with a rack bar or plunger 392 slidably mounted in the bracket 349 and reciprocable therein in a direction at right angles to the rack bar 390. Normally the rack bar 392 is held in the position shown in Fig. 22 by engagement of the finger 365 with the collar of the plunger 359. But when the finger is released by pin 369 on tripping of the control mechanism 350, the upward movement of the plunger 359 under actuation of the spring 364 moves the rack bar 390 upwardly rotating the pinion 391 on its axis and moving the rack bar or plunger 392 outwardly. In the continued rotation of the turret, this rack bar or plunger 392 comes into contact with the cam 378 which forces it inwardly. The inward movement of the rack bar 392 rotates the pinion 391 on its axis in a direction opposite to that just described depressing the rack 390 and withdrawing the plunger 359 from the chamber 360 thus sucking oil into the chamber from the supply pipe 295 and valve 396, filling the chamber 360 for the next lubricating shot. The plunger 359 is moved downwardly far enough to permit the finger 365 to be reengaged over the collar 363 of the plunger under actuation of the spring pressure plunger 368. The control device 350 automatically resets itself so that the pump is not actuated again until the control device has again been tripped after the turret has again revolved the predetermined number of revolutions for which the control mechanism is set.

Power is supplied to the motor 120 which rotates the turret through any suitable electrical connection with an outside source of current. Power is supplied to the motors 70 which rotate the several cutters 38 through wires 398 connected to this same source of current. The wires 398 are housed in a conduit 399 (Figs. 1 and 19), which is secured to the cutting oil supply pipes 284 and 285 by clamps 400. The conduit 399 houses the two wires comprising the armature circuit of the motors, the two wires comprising the field windings of the motors, and the two wires of the overload relay circuits, as will be described more particularly hereinafter. These several wires lead from the conduit 399 through an opening 401 in the trunnion 289. They are connected through suitable connections 397 secured in the trunnion 289 with the rings 402 secured to the trunnion. A brush 403 contacts with each of the rings 402 so that the trunnion 289 really constitutes a commutator. The brushes are mounted in a box 404 secured to the drum 295 and are connected to the wires 405. The wires 405 are housed in a conduit 406 which passes into the box 407 (Figs. 1 and 2) mounted on the upper portion 36 of the turret. From this box 407 the wiring is divided, passing into the conduits 408 and 409 and thence to the overload relays designated generally at 410. There is one overload relay provided for each motor. The armature and field wires of each motor 70 pass through the corresponding relay, and into cables 411 whence they are connected with the motor.

The overload relays are provided, one for each motor 70, to stop the machine when through any cause one of the motors 70 is overloaded, as, for instance, when the cutter 38 driven thereby becomes dull. These relays are wired in circuit with the motors 70 and motor 120, as will be described more particularly hereinafter, and are adapted to break the circuit when any one of the motors is overloaded.

The relays may be of any suitable construction. One possible construction is illustrated in Figs. 27 and 28. Here, the parts are housed in a box consisting of a cover 412 and a back plate 413. Secured to the back plate 413 is a U-shaped bracket 414. Mounted on a pin 415 that is pivoted in the ears 416 formed on the U-shaped bracket is a bell crank lever 417. To one end of this lever 417 is secured a contact plate 418 that serves to bridge the terminals 419 and 420. A coil spring 421 mounted on the U-shaped bracket 414 and engaging the short arm of the bell crank lever 417 maintains the bell crank lever normally in the position shown in the drawing with an electrical circuit made between the terminals 419 and 420 through the contact plate 418. Mounted between the arms of the U-shaped bracket 414 is the spool 422 of a solenoid. Mounted in the spool for reciprocation therein is a plunger 423. When a motor 70 is overloaded, the plunger 423 of the corresponding relay is moved upwardly, engaging the nose 424 formed on the bell crank arm 417 and moving the bell crank against the resistance of the spring 421 to disengage the contact plate 418 from contact with the terminals 419 and 420, and break the motor circuit. The motors and relays are preferably wired together, as will be described more particularly hereinafter, so that when the circuit is broken in one relay it will automatically stop all the motors including the motor 120.

The amount of overload required to break the circuit can be predetermined by adjusting the plunger 423, an index being provided at 425 for this purpose which reads against an index pointer 426.

As all of the motors stop together, it is desirable to provide some means for indicating to the operator which motor has caused the stopping of the machine. The indicating devices are the same for each relay and one only need be described here. Threaded into the cover 412 of each relay box 410 is a nipple 430 which serves as a housing for a plunger 431 which has a preferably colored tip as indicated at 432. A coiled spring 433 housed in the nipple 430 serves to constantly urge the plunger outwardly. The plunger is normally held concealed within the nipple 430, however, by a catch 434 which has a hooked portion adapted to engage a head 435 provided on the plunger 431 at its inner end. The catch 434 is pivoted at 436 on a bracket 437 secured by screws 438 to the cover 412. The hooked arm of the catch is longer than its other arm and therefore heavier so that the catch is constantly urged by gravity into engagement with the head 435 of the plunger 431. The other or shorter arm of the catch has a pin 439 on it. When a motor 70 is overloaded and the bell crank lever 417 of the corresponding relay is moved backwardly against the resistance of the spring 421, the long arm of the bell crank 417 engages the pin 439 of the catch 434 and rocks the catch about its pivot 436 releasing the plunger 431 which is immediately pushed outwardly by the spring 433. The operator can thus tell at a glance which one of the motors has been overloaded and change the necessary cutter or make the necessary repairs. After the changes or repairs have been made, the operator simply presses the plunger 431 in again by hand and the catch 434 again drops by gravity into engagement with the head 435 of the plunger to hold it in withdrawn position.

In putting the machine into operation, the cutter motors are preferably started first and then the turret drive motor 120 to prevent putting an excessive load on the line as would be the case if cutter motors and the drive motor 120 were started simultaneously. The cutter motors are started by pushing the start button of the combined start and stop electric control 450 (Figs. 2 and 3). The motors 70 can be stopped by pushing the stop button of this electrical control 450. The drive motor 120 can be started or stopped, respectively, by pushing the start or stop button of the electrical controller 451. The two controllers can be mounted in juxtaposition on the removable guard plate 452 or any other suitable part of the machine.

As the turret is intended to rotate continuously during the operation of the machine, the operator has only a certain limited time in which to take off a completed gear and put a new blank in position at the loading station. To prevent injury to him and damage to the machine or new blank if the operator has not accomplished the required operation within the time allotted, there is, as already stated, incorporated in the present machine a safety feature which automatically stops the machine if the new blank has not been chucked by the time the work head in the normal course of operation of the machine has started on its return movement into operative position. The safety device will described.

Mounted on a bracket 455 secured to the base 30 of the machine (Figs. 2 and 3) is an electric push button 456. Secured to each work head 80 is a lug 457 adapted to make contact with this button 456 in the travel of each work head from loading position back into operative relation with its tool. The button 456 is in circuit with the main drive motor 120 and normally in closed position. Each lug 457 moves relative to the button 456 during the movement of the corresponding work head at the loading station in a path indicated partially by the dotted line 458 in Fig. 3. As will be seen, the lug 457 is arranged to contact with the button 456 just as the work head is about to begin its return movement into operative position. When the lug contacts with the push button 456, it breaks the circuit stopping the motor 120 and the rotation of the turret. By this arrangement, the turret will normally be stopped before each work head has returned completely into operative relation with its tool, whereby any possibility of the work head being returned into operative position with the new blank still not completely positioned thereon is eliminated. If the blank is not positioned in time and the turret is stopped, it can always be started again by pushing the start button of the control 450.

The push button 456 is so placed that ordinarily an operator will have had plenty of time to take off the completed gear from the work head and put a new blank in position before this push button is actuated. To avoid unnecessary stopping and starting of the turret, eliminate waste time, and give the operator an opportunity to perform other work, means has been provided whereby the operator may render the push button 456 inoperative if he has taken off the completed gear and chucked the new blank before a lug 457 has reached the push button 456. This he can do by pushing the button 460 which may be mounted alongside the controls 450 and 451 on the guard 452 or in any other suitable position on the machine. The button 460 operates to short circuit the button 456 so that after the button 460 has been pushed, the lug 457 in striking the button 456 will simply depress the plunger of the button 456 without having any effect on the circuit to the motor 120, that is, without stopping the turret.

With the button 460 short circuiting the button 456, some means must be provided to put the button 456 back into the main circuit of the motor 120, after the lug 457 has passed by it, in order that the button 456 to be able to function as a stop device when the next work head is at the loading station. To this end, there is secured to the bracket 455 along side the button 456, a second button 462 which is in circuit with the button 460. If the button 456 has been short circuited and rendered inoperative as described by pushing the button 460, the button 462 can be depressed to again connect the button 456 in the circuit of the motor 120 ready to function again as a stop. This is done automatically.

Secured along side the lug 457 on each work head is a lug 464. The path of this lug in the movement of the work head is partially indicated by the dotted line 465 in Figure 3. It will be seen that after the lug 457 has passed over the push button 456 the lug 464 will strike the push button 462 to restore the button 456 to the circuit of the motor 120.

Briefly, then, if the operator has not taken a completed gear off of a work head and chucked the new blank at the loading station before the work head has started to return into operative position, the lug 457 will strike the push button 456 and the turret will be stopped to give the operator time to complete the chucking. He can do this and then restart the turret by pushing the push button of the control 450. If however, he has completed the removal of the completed gear and chucking of a new blank, as will ordinarily be the case, in less than the allotted time, he can simply render the stop button 456 inoperative by pushing the button 460. The lug 457 will then pass idly over the plunger of the push button 456 without affecting the operation of the machine. When subsequently the lug 464 strikes the push button 462, the push button 456 will be reconnected in the circuit of the motor 120 ready to function again when the next work head arrives at the loading station.

One way in which the machine may be wired to permit of the various electrical features described above, is illustrated, for the sake of example, in Figure 29. It will be readily understood, however, that there are other ways in which the machine may be wired to secure the desired results.

Each of the cutter drive motors 70 comprises an armature 500 and a field winding 501. The turret drive motor 120 comprises an armature 503 and a field winding 504. 506 and 507 designate the feed lines from which current is supplied to the machine.

The circuit is closed through a magnetic switch 509. This switch comprises a pair of switch arms provided with contact members 510 and 511 which are adapted to engage the stationary contacts or terminals 512 and 513, respectively, to throw the main lines 514 and 515, which supply current to the machine, into circuit with the feed lines 506 and 507. The arms of the switch 509 are closed and held closed by the electromagnet 517 which is controlled from a combined start and stop button 518, the start button being indicated at 519 and the stop button at 520. When the switch 509 is once closed it ordinarily remains closed while the machine is in use. The switch 509 is intended to operate to break the circuit only when one of the motors becomes overloaded, as will appear hereinafter.

The main lines 515 and 514 are connected, respectively, to the terminals 522 and 523 of a magnetic controller designated generally at 524 and the line 514 is also connected to the terminal 526 of a magnetic controller 528. The controller 524 is intended to control the cutter drive motors 70 while the controller 528 is intended to control the turret drive motor 120. These controllers are provided to avoid throwing too large a load suddenly on the motors when starting the machine and to afford a dynamic breaking action when the motors are to be stopped. These magnetic controllers 524 and 528 may be of any usual or suitable construction and while a particular construction has been shown it is intended for the purpose of illustration only.

One side of the line to the armatures 500 of the cutter drive motors 70 is connected to the terminal 530 of the controller 524 and the circuit extends from this terminal through the line 532, one of the contact members 397, one of the rings 402 of the commutator 289, one of the brushes 403, the line 534, the line 535 and either of the terminals 536 or 537 to one side of each of the armatures, then back through the coils of the solenoids 422 of the overload relays 410, through the lines 539 and 540, one of the brushes 403, one of the commutator rings 402, one of the contact members 397, through the line 542, to the terminal 543 of the controller 524.

One side 545 of the line to the field windings of the motors 70 is secured to the terminal 546 of the magnetic controller 524 and the circuit extends thence through one of the contact members 397, one of the rings 402 of the commutator, one of the brushes 403, the lines 548 and 549 to the field windings 501 and thence back through the lines 550 and 551, one of the brushes 403, one of the rings 402 of the commutator, one of the terminals 397 through the line 552 which is connected to the main line 514.

One terminal 554 of the combined start and stop button 450 which as already described is used for starting or stopping the cutter drive motors 70, is connected to the terminal 556 of the magnetic controller 524 by the line 557. Another terminal 558 of this combined start and stop button 450 is connected by the line 559 with the terminal 560 of the controller 524 and the start and stop button 450 is also connected by the line 562 with the armature line 532.

One side 565 of the armature 503 of the turret drive motor 120 is connected to the terminal 566 of the magnetic controller 528. The other side of the armature of this motor is connected by the line 568 to the terminal 569 of the controller 528. One side of the field winding 504 of the motor 120 is connected by the line 570 with the terminal 571 of the controller 528 while the other side of this field winding 504 is connected by the line 572 with the main line 514.

One terminal 575 of the combined start and stop button 451, which as already described is used for starting or stopping the turret drive motor 120, is connected by the line 576 with the terminal 577 of the controller 528. The terminal 579 of this combined start and stop button 451 is connected by the line 580 to the terminal 581 of the controller 528. The combined start and stop button 451 is connected also by the line 582 with the armature line 565. The terminal 583 of the controller 528 is connected by the line 584 with the armature line 542 of the motors 70.

The overload relays 410 of which one is provided for each cutter drive motor 70, as already described, are wired in series. The circuit to these relays extends from the terminal 512, through the winding of the electromagnet 517 and the line 585, to one of the terminals 397, thence through one of the rings 402 of the commutator 289, one of the brushes 403, the line 587, the several terminals 419 and 420 and the several contact pieces 418 of the several relays, the line 589, one of the brushes 403, one of the rings 402 of the commutator 289, one of the terminals 397 through the line 590 to the spring terminal of the combined start and stop button 518 and, when the switch 509 is closed, through the line 592 to the main line 515.

To permit the machine to be started it is first necessary to close the switch 509. This is done by pressing in the starter button 519 completing the relay circuit just described momentarily through the line 591 to the terminal 573 and energizing the magnet 517 which closes the switch 509. This action connects the main lines 514 and 515 with the feed lines 506 and 507. The starter button 519 is spring-pressed open so that the relay circuit remains closed through the terminal 520 and line 592.

The operator can now start the machine. To avoid putting too heavy a load on the line initially when starting, the wiring has been arranged so that the turret drive motor 120 cannot be started until after the cutter drive motors 70 have been started. This is the purpose of connecting the terminal 583 of the controller 528 with the armature line 542 of the motors 70.

To start the cutter motors, the operator presses in the start button 595 of the combined start and stop button 450. This acts initially to close a circuit from the main line 514, through the terminal 522 of the controller 524, the temperature relay 597 of this controller, through the terminal 560 of the controller and the line 559, to the terminal 558 of the stop side of the combined start and stop button 450, thence through the button 595, the terminal 554, the line 557, the terminal 556, the line 599 of the controller 524, the winding 600 of an electromagnet mounted in the controller 524, the lines 601 and 602 of the controller, to the terminal 523 and thence to the main line 515. Closing the starter button 559 acts first then to energize the electromagnet 600. This causes the switch arm 605 to make contact through the contact member 607 with the contact point 608 of the controller. The circuit then extends from the main line 514 through the terminal 522, the line 610 of the controller, the contact members 608 and 607, the line 612 and the terminal 530, through the armature circuit of the motors 70, thence through the terminal 543, the line 614 of the controller, the starter resistor 516, the line 602 and the terminal 523 to the main line 515. By an intermediate connection through the lines 617 and 618, the second electromagnet 620 of the controller 524 is then automatically energized, causing the switch arm 622 to make contact through the contact member 624 with the contact point 626. When this is done, the starter resistor 615 is cut out of the circuit, the circuit now extending from the line 514 through the terminal 522, the line 610, the terminals 608 and 607, the line 512, and the terminal 530, through the armature circuit of the motors 70 and thence back to the terminal 543, the line 614, the contact members 626 and 624, the line 602 and the terminal 523 to the main line 515. The field circuit to the motors 70 is made through the lines 522 to the main line 514 and through the terminal 546, the line 628, the contacts 623 and 629, the line 602, and terminal 523 to the main line 515. These last named circuits are the normal running circuits of the motors 70.

After the cutter motors 70 have been gradually started, through the functioning of the controller 524, a circuit will have been made to the controller 528 from the main lines 515, through the controller 524, and the line 584, so that both main lines 514 and 515 will now be in circuit with the controller 528 and the turret drive motor 120 can be started. This is done by pushing in the start button 630 of the combined start and stop button 451. The operation of the controller 528 is identical with that of the controller 524 and need not be specifically described here. Suffice it to say that when the push button 630 is pushed in, the electromagnet 632 is first energized to close a circuit through the contact point 633 and the contact member 634 of the switch arm 635 and through the starter resistor 637 to the armature circuit of the motor 120 and then the electromagnet 639 is energized to cut the starter resistor 637 out of the circuit and permit the motor 120 to run at its normal operating speed. In the case of both controllers, the windings 640 act as braking resistors (dynamic brakes).

With the motors 70 and the motor 120 running, the machine performs its functions. The cutters rotate continuously on their axes driven by the motors 70 and the work heads receive an alternate feed and withdrawal movement and are indexed periodically as the turret rotates on its axis under actuation of the motor 120. At the loading station, the work heads are successively swung away from their respective tools, as already described, to permit removal of the completed gears and placing of new blanks in position. If the operator has not completed the positioning of a new blank by the time the work head is about to start its return movement into operative position, the lug 457 on the work head will strike the button 456 on the base of the machine breaking the circuit to the turret drive motor 120 and stopping the rotation of the turret. The terminals 645 and 646 of this push button 456 are connected by the line 648 and the lines 649 and 650, respectively, with the terminals 575 and 579 of the combined start and stop button 451. The start button 630 of this combined start and stop control 451 is normally spring pressed into open position so that when it is pushed in to start the motor 120, it is closed momentarily only and immediately springs open and the circuit which it establishes remains closed through the button 456. Hence, when the button 456 is opened by the lug 457 this circuit will be broken and the motor 120 stopped.

If the operator has taken off the completed gear and positioned a new blank in less than the allotted time there is no necessity for stopping the machine. He, therefore, presses the button 460 closing a circuit which extends from the main line 515 through the line 652, the fuse 653, the line 654, the winding of the electromagnet 655, the line 656, the terminal 657, the button 460, the terminal 658, the line 659, the fuse 660, and the line 661 back to the main line 514, thus energizing the electromagnet 655. The energized electromagnet 655 closes the double-armed magnetic switch 665 bringing the contact member 666 of this switch into contact with the terminal 667 and the contact member 669 of this switch into contact with the terminal 670. The button 460 is normally spring pressed into open position so that it makes the circuit of the electro-magnet 655 momentarily only but this circuit is held closed by the contact member 666 which is in contact with the contact point or terminal 667, the circuit now extending from line 515 through line 652, fuse 653, line 654, the winding of electromagnet 655, contact point 667, contact member 666, line 675, button 462 which is held in normally closed position, through line 676, terminal 658, line 659 and line 661 back to main line 514. Hence, the contact member 669 is held in contact with the point or terminal 670, thus short circuiting the button 456 through the lines 649 and 650 and the line 672.

Hence, when the button 460 is pushed in by the operator, the button 456 is short circuited. Therefore when the lug 457 subsequently contacts with the button 456 it simply pushes this button out without in any way affecting the circuit.

As the work head is swung further in, however, the lug 464 comes into contact with the button 462 and pushes this button, which is normally spring-pressed into closed position, open, thus breaking the circuit to the electromagnet 655, releasing the double-armed switch 655, and putting the button 456 back into the main circuit, so that this button is reset for operation when the next work head arrives at the loading station.

If, for any reason, one of the motors 70 becomes overloaded, the corresponding solenoid 422 will pull the corresponding plunger 423 breaking the relay circuit, thereby de-energizing the magnet 517 and allowing the double-armed switch 509 to return to open position, breaking the connection between the feed lines 506 and 507 and the main lines 514 and 515, thus stopping not only the motors 70, but the motor 120. The operator can tell at a glance by the corresponding indicator button 432 which one of the motors 70 has been overloaded and can change the cutter driven by this motor or make any necessary repairs to the motor or changes in the circuit required. The machine can then be started up again by first pressing the starter button 519, to again close the switch 509 and then pressing the starter button 595 to start the motor 70 after which the starter button 630 may be pressed to start the motor 120.

It is believed the operation of the machine will be clear from the preceding description but it may be briefly summed up as follows: The cutters 38 are first adjusted to the position required to cut gears of the desired root and spiral angles by adjusting the saddles 43 and the upper portion 36 of the turret on the lower portion 35 thereof and, if necessary, by replacing the shims or plates 45 by other shims or plates of the required thickness. The change gears 124 and 125 and the cams 159 and 160 will be selected so that the turret rotates at the proper speed and the indexing and alternate feed and withdrawal movements take place at the proper intervals and are of the proper extent. When the adjustments have been made and the proper changeable parts are in position, the machine can be started as already described by first closing the switch 509, then pressing the start button 595 to start the motors 70, and, after the cutters 38 are running, then pressing the start button 630 to start the turret motor 120. The cutter drive motors 70 drive the cutters continuously during the operation of the machine through the gearing 71, 72, 74, 75, 77 and 78 as shown in Figure 1.

The turret is driven continuously through the gearing 121, 122, 124, 125, 129, 130, 134, 135, 139, 140, 144, 145, 147, 148, 149 and 150, as illustrated in Figures 1 and 3.

As the turret rotates, the cams 159 and 160, corresponding to each work head, are rotated continuously on their axes, being driven in each case from a corresponding shaft 136 through the corresponding worm 155 and the corresponding worm wheel 156 as shown in Figs. 1 and 3. Through the engagement of roller 162 with a corresponding cam 160, there are imparted to each work head alternate movements of feed and withdrawal as the work head moves with the turret from loading station back to loading station again. The number of feed and withdrawal movements in this cycle are equal to the number of tooth spaces to be cut in the blank, so that in one revolution of the turret the required number of tooth spaces will have been roughed out in the blank and, after the machine has once been completely loaded, a completely roughed gear can be taken off the machine each time a work head passes the loading station.

In the feed and withdrawing movements, each work head is guided by the movement of the corresponding sleeve 81 on the corresponding trunnions 82 and by the sliding movement of the corresponding locking jaws 220 and 221 and sleeve 168 on the corresponding rod 165.

The periodic indexing movement of each work spindle is effected from the corresponding cam 159. Each work spindle is first released through rotation of the shaft 181 to move the bevel gear 212, blocks 205 and 206 to released position. Then the segment 183 on this shaft engages the segment 184 to move the arm 195 and cam 196 in the direction of the arrow 193 (Fig. 14) to first withdraw the locking dog 188 from the notch 189 of the index plate 187 with which it has previously been engaged, and then bring the pawl 198 into this same notch, so that, in the further movement of the arm 195 in the direction indicated, the index plate 187 and and work spindle 90 are ratcheted through an angular distance equal to the pitch or a multiple of the pitch of the gears to be cut. When this has been done, the cam 196 has moved clear of the stud 197 and lever 190 is free to return to locking position under impulse of the spring pressed plunger 192. The pawl 198 is, therefore, rocked out of engagement with the index plate 187 by contact of the cam 201 with the tail of this pawl and the locking dog 188 drops into a new notch of the index plate with the blank indexed. The shaft 181 is then reversed to return the arm 195 to original position. In this movement the gear 212 is reversed to move the blocks 205 and 206 to locking position, to again securely lock the spindle 90 against rotation in its head during cutting. The shaft 181 is intermittently oscillated, as described, from the cam 159 through the corresponding roller 171, plate 175, rack 178, and spur gear segment 180.

As the turret rotates around, then, each work head is alternately moved toward and into engagement with the corresponding cutter 38, to cut tooth spaces of proper depth on the blank, and withdrawn from engagement with the cutter, and, when withdrawn, the work spindles are indexed. During the last feed movement of each work head, for cutting the last tooth space in the blank, the roller 239 of the stud 238 corresponding to that work head strikes the lug 235 which is secured to the base of the machine and the stud 238 is rotated on its axis to swing the arm 240 of the stud beneath the trip rod 232 of that work head. On the subsequent withdrawal movement of that work head, the head slides down, but the rod 232 is held in upper position, with the result that the upper end of this rod engages the short arm of the pivoted lever 224, forcing this lever down against the action of the spring pressed plunger 227, and releasing the movable clamping jaw 222 which acts normally in conjunction with the fixed jaws 220 to hold the work head in operative relation with its corresponding tool (see Figs. 17, 18 and 6). The roller 244 corresponding to the work head (Fig. 6) now strikes and enters the cam path 247 of the cam 246 which is secured to the base of the machine and the work head is swung away from its corresponding tool as shown clearly in Figures 2 and 3. As the work head swings away, the corresponding blank chucking mechanism is released through tilting of the stud 253 by the corresponding lever arm 259 the tilting movement acting to move the draw-rod 97 upwardly into released position as shown clearly in Figures 6 and 7.

As the work head moves out, the cutting oil is also shut off by mechanism such as illustrated in Figures 4 and 5 and in Figs. 25 and 26.

With the chucking mechanism released, the operator can take the completed gear off the machine by readily turning the plate 100 to bring the opening 99 of this plate into register with the ears 98 of the draw rod head and by lifting this plate off and then taking off the gear G, (see Figs. 6 and 8). The operator then slips a new blank onto the machine centering it by the pin 94, puts a plate 100 back in position and turns it to lock it by engagement of the ears 98 of the draw rod head over the corresponding ears formed on the plate 100.

If the operator does not complete the taking off of the completed gear and positioning of a new blank in the allotted time before the work head starts to swing back into operative position, the machine is stopped by engagement of the lug 457 on the work head (Fig. 3) with the electric push button 456. If, however, the operator has completed the chucking operation, he presses the button 460 to short circuit the button 456 and the work head moves on. As the head returns into operative position, the lug 464 strikes the button 462 and puts the button 456 back into circuit ready to operate when the next work head arrives at the loading station.

As the work head swings back into operative position, the stud 253 (Figs. 6 and 7) is rocked back into alignment with the draw rod 97 and the spring 105 presses the draw rod downwardly to securely clamp the blank G on the work spindle. At the same time the cutting oil is turned on again by the operation of either of the apparatus shown in Figures 4 and 5 and Figures 25 and 26.

In each revolution of the turret, the plunger 376 strikes the lug or cam 378 (Figs. 22 and 23) so that a step by step movement is imparted to the control device 350 through the lever 382 and plunger 354 and after the turret has made the required number of revolutions, as predetermined by experience, the control device trips to release the plunger 359 of lubricating oil pump through engagement of the pin 369 with the arm 366 which carries the finger 365. As soon as the plunger is released, the spring 364 forces it upwardly, rotating the pinion 391 through engagement of the rack 390 of the plunger therewith, and moving the plunger 392 outwardly. The upward movement of the plunger under impulse of the spring 360 forces the lubricating oil into the receptacle 374 at the top of the machine (Fig. 19) whence it is distributed to the various parts requiring lubrication. The plunger 392 now strikes the lug 378 secured to the base of the machine and is forced inwardly drawing the plunger 359 downwardly through the gearing 392, 391, 390 and sucking the lubricant into the chamber 360. In the downward movement of the plunger, the finger 365 is again forced into locking position by the spring pressed plunger 368 and holds the plunger down until again tripped by the control device 350 after the predetermined variable number of revolutions in the turret have again taken place.

As the work spindles rotate on their axes through their intermittent indexing movement, the chips and cutting oil are swept out of the trough of the corresponding work head guard 305, down the spout 330, through the opening 332 and the spout 333 (Figs. 6, 14 and 15), onto the oil pan 334 whence they are swept into the separating receptacle 345 by the wipers 341.

If a cutter becomes dull or for any reason one of the motors becomes overloaded, the corresponding relay 410 functions to stop the machine and to rock the catch 434 (Figs. 27 and 28) about its pivot, to release the plunger 431 which carries the indicator button 432. This is forced outwardly by the spring 433 so that the operator can tell at a glance which motor has been overloaded and take the necessary steps to correct the conditions causing the overload.

While the present invention has been described in connection with a machine for producing gears, there are various features of the invention which are applicable to machines for other purposes. Moreover, while the invention has been described in connection with a particular embodiment or particular embodiments, it is to be understood that the invention is capable of various modifications within its scope and this application is intended to cover any variations, uses, or adaptations of the invention, following, in general, the principles of the invention and including such departures from the present disclosure as come within known or customary practice in the art to which the invention pertains and as may be applied to the essential features set forth and as fall within the scope of the invention or the limits of the appended claims.

Having thus described our invention, what we claim is:

1. In a machine for producing tapered gears, a base, a turret rotatably mounted thereon, a plurality of work spindles rotatably mounted on the turret, a plurality of tool supports mounted on the turret, one for each work spindle, a rotary cutter journaled in each tool support which has its cutting edges extending in a direction generally parallel to its axis, means for adjusting the several tools into operative relation with the blank carried by said work spindles so that the axis of each work spindle is inclined to the axis of the corresponding tool at an angle determined by the root angle of the gear to be produced, means for rotating the cutters, means for rotating the turret, and means for feeding the blank relative to the tools during the rotation of the turret.

2. In a machine for producing tapered gears, a base, a turret rotatably mounted thereon, a plurality of work spindles rotatably mounted on the turret, a plurality of tool supports mounted on the turret, one for each work spindle, a rotary cutter journaled in each tool support which has its cutting edges extending in a direction generally parallel to its axis, means for adjusting the several tools into operative relation with the blank carried by the work spindles so that the axis of each work spindle is inclined to the axis of the corresponding cutter at an angle determined by the root angle of the gear to be produced, means for rotating the cutter, means for rotating the turret, means for feeding the blanks relative to their tools during the rotation of the turret, and means for automatically producing a relative movement of separation between the work spindles and their respective tools as they come successively to loading position.

3. In a machine for producing tapered gears, a base, a turret rotatably mounted thereon, a plurality of work spindles rotatably mounted on the turret, chucking mechanism for each work spindle for securing a gear blank thereto, a plurality of tool supports mounted on the turret, one for each work spindle, a rotary cutter journaled in each tool support which has its cutting edges extending in a direction generally parallel to its axis, means for adjusting the several tools into operative relation with the blanks carried by the work spindles so that the axis of each work spindle is inclined to the axis of the corresponding cutter at an angle determined by the root angle of the gear to be produced, means for rotating the cutter, means for rotating the turret, means for feeding each blank relative to the corresponding tool during rotation of the turret, means for automatically producing a relative movement of separation between the work spindles and their respective tools as they successively reach loading position, and means adapted to be operated by the last named movement for automatically releasing the chucking mechanism.

4. In a machine of the class described, a base, a turret rotatably mounted thereon, a plurality of tools mounted on the turret, a plurality of work supports movably mounted on said turret, one of which is paired with each tool, a work spindle journaled in each work support, means for imparting a cutting movement to the tools, means for rotating the turret continuously, means for indexing the work spindles periodically during the rotation of the turret and means for swinging the work supports successively away from their respective tools when each reaches a predetermined position, to permit removal of the completed work and chucking of a new blank.

5. In a machine of the class described, a base, a turret rotatably mounted thereon, a plurality of work supports pivotally mounted on the turret, a plurality of tools mounted on the turret, one of which is paired with each work support to operate on the blank carried by said work support during rotation of the turret, means for imparting a cutting movement to the tools, means for rotating the turret, means for moving the work supports successively about their respective pivotal axes when each reaches a predetermined position to swing the work supports successively away from their respective tools to permit removal of the completed work pieces and chucking of new blanks.

6. In a machine of the class described, a base, a turret rotatably mounted thereon, a plurality of work supports movably mounted on the turret, a plurality of tools mounted on the turret, one of which is paired with each work support to operate on the blank carried by said work support during rotation of the turret, means for imparting a cutting movement to the tools, means for securing the several work supports in operative position during the cutting operation, means for rotating the turret, and means for releasing the work support securing means successively as each work support reaches a predetermined position to permit movement of the work supports successively away from their respective tools for removing the completed work and chucking of a new blank.

7. In a machine for producing gears, a base, a tool mounted on the base, a work support pivotally mounted on the base, means for adjusting the tool and work support into operative relation, means for imparting a cutting movement to the tool, and means for automatically moving the work support about its pivotal axis when the work has been completed to swing the work support away from the tool to permit removal of the completed gear and chucking of a new blank.

8. In a machine for producing tapered gears, a base, a face milling cutter rotatably mounted on the base, a work spindle journaled in the work support, means for adjusting the tool and work support into operative relation with the axis of the work angularly disposed to the axis of the tool, means for rotating the tool, a cam shaft, a pair of cams mounted thereon, cooperating means between one of said cams and the work spindle for imparting an alternate movement of feed and withdrawal periodically to the work spindle, indexing mechanism for the work spindle, and cooperating means between the second cam and the indexing mechanism for actuating the indexing mechanism during each period of withdrawal.

9. In a machine of the class described, a base, a tool mounted thereon, a work support movably mounted on the base, means for clamping the blank in position on said work support, means for adjusting the tool and blank into operative relation, means for imparting a cutting movement to the tool, means for moving the work support away from the tool and means actuated by said last named movement to release said clamping means.

10. In a machine of the class described, a base, a tool support, a tool mounted thereon, a work support, one of said supports being pivotally mounted on said base for movement away from the other to permit removal of the completed work and chucking of a new piece, means for imparting a cutting movement to the tool, means for supplying a coolant to the work during cutting and means operated by the relative pivotal movement between tool and work away from each other to shut off said coolant.

11. In a machine for producing gears, a work support, a work spindle journaled therein, a notched index plate secured to said work spindle, a lever pivotally mounted on said work support, a locking dog carried thereby, means constantly urging said dog into engagement with said notched plate, an arm rotatably mounted on said spindle, a cam member carried by said arm adapted on rotation of said arm in one direction to engage said lever to withdraw said locking dog from engagement with said notched plate, a pawl carried by said arm, means constantly urging said pawl into engagement with said notched plate, means on said lever preventing such engagement while the locking dog is in engagement with the notched plate, and means for periodically oscillating said arm in opposite directions to first index the work spindle and then return the arm and parts carried thereby to initial position with the spindle indexed.

12. In a machine for producing gears, a base, a pair of carriers mounted on the base, a work support mounted on one of said carriers, a tool support mounted on the other carrier, a rotary annular face mill journaled in said tool support, one of said carriers being angularly adjustable relative to the other and one of said supports being adjustable on its carrier about an axis perpendicular to the axis about which said first named angular adjustment takes place.

13. In a machine of the class described, a base, a turret rotatably mounted on the base, means for imparting movement to the turret, a pump mounted on the turret, and a cam on said base adapted to actuate said pump at a predetermined point in the rotation of the turret, whereby to cause the pump to pump a lubricant to various parts of the machine.

14. In a machine of the class described, a base, a turret rotatably mounted on the base, a pump mounted on one of said parts means on the other part for actuating said pump, a control device preventing actuation of said pump during a predetermined variable number of rotations of the turret and means adapted to be given a step by step movement on each rotation of the turret to trip said control device after the predetermined number of rotations have been completed.

15. In a machine for producing gears, a base, a turret rotatably mounted on the base, a plurality of rotary face milling cutters mounted on the turret, a plurality of work supports mounted on the turret, one of which is paired with each tool support, a work spindle journaled in each work support, indexing mechanism for each work spindle, means for rotating the tools, a main drive shaft extending coaxially of the turret, means for driving said shaft continuously from a source of power, a plurality of cam shafts journaled in said turret, one for each work support, a plurality of shafts extending radially of said main drive shaft and driven therefrom, means for driving said cam shafts from said radial shafts, a pair of cams on each cam shaft, one of which is adapted to impart an alternate movement of feed and withdrawal periodically to the corresponding work support during rotation of the turret, and the other of which is adapted to operate the corresponding index mechanism during the periods of withdrawal, a ring gear secured to the turret and means driven from one of said radial shafts for rotating said ring gear to rotate the turret continuously.

16. In a machine of the class described, a base, a turret rotatably mounted on the base, said base being provided with a cylindrical guide surface on which the turret moves, a plurality of tools mounted on the turret, individual motors mounted on the turret for actuating said tools, a fixed support above said turret, a commutator surrounding said fixed support and comprising a plurality of rings, means for supplying current internally to said rings, a housing secured to said turret and rotatably guided on said fixed support and a series of electrical connections mounted in said housing adapted to cooperate externally with said rings and connect said rings with the individual motors.

17. In a machine for producing gears, a base, a turret rotatably mounted thereon, a plurality of work spindles rotatable in said turret, a plurality of tools mounted on the turret, one of which is paired with each work spindle to operate on the blank carried thereby during rotation of the turret, means for adjusting the several work spindles and tools into operative relation with each other, means for actuating the tools, means for periodically indexing the work spindles during rotation of the turret, means for rotating the turret continuously and means for automatically producing a relative movement of separation between the work spindles and their respective tools as each pair successively reaches a predetermined position to permit removal of the completed gear from the work spindle and chucking of a new blank.

18. In a machine for producing gears, a base, a turret rotatably mounted thereon, a plurality of work supports mounted on the turret, a work spindle journaled in each work support, a plurality of tools mounted on the turret, one of which is paired with each work spindle to operate on the blank carried thereby during rotation of the turret, means for adjusting the several work supports and tools into operative relation with each other, means for actuating the tools, means for imparting alternately a relative movement of feed and withdrawal between the respective tools and work spindles, means for indexing the work spindles during the periods of withdrawal, means for rotating the turret continuously and means for automatically producing a relative movement of separation between the work spindles and their respective tools as each pair successively reaches a predetermined position to permit removal of the completed gear from the work spindle and chucking of a new blank.

19. In a machine of the class described a base, a turret rotatably mounted thereon, a plurality of work supports mounted on the turret, a plurality of tools mounted on the turret, one of which is paired with each work support, means for adjusting the several work supports and tools into operative relation with each other, means for clamping a blank to each work support, means for actuating the tools, means for rotating the turret continuously, means for automatically producing a relative movement of separation between the work supports and their respective tools as each pair successively reaches a predetermined position to permit removal of the completed work and chucking of a new blank, and means actuated by said last named movement to release the clamping means.

20. In a machine of the class described, a base, a turret rotatably mounted thereon, a plurality of work supports mounted on the turret, a plurality of tools mounted on said turret, one of which is paired with each work support, means for adjusting the several work supports and tools into operative relation with each other, means for supplying a coolant to the several work pieces during cutting, means for actuating the tools, means for rotating the turret continuously, means for automatically producing a relative movement of separation between the work supports and their respective tools as each pair successively reaches a predetermined position to permit removal of the completed work and chucking of a new blank, and means actuated by the last named movement for shutting off the coolant.

21. In a machine for producing tapered gears, a base, a turret rotatably mounted on the base for movement about a vertical axis, a plurality of tool supports mounted on the turret, an annular face mill rotatably mounted on each tool support, a plurality of work spindles rotatably mounted on the turret with their axes parallel to the axis of the turret, one of said work spindles being paired with each of the tools, means for adjusting the several tools and work spindles into operative relation with each other with the axis of each tool inclined to the axis of the corresponding work spindle, means for rotating the tools continuously, means for rotating the turret continuously, means for imparting periodically an alternate movement of feed and withdrawal to each work spindle in the direction of its axis during the rotation of the turret, and means for indexing the work spindles during the periods of withdrawal.

22. In a machine of the class described, a base, a turret rotatably mounted on the base, electrically operated means for rotating the turret continuously, a plurality of work supports movably mounted on the turret, means operative during rotation of the turret for moving the work supports successively to inoperative position and back into operative position again at a loading station to permit removal of the completed work piece and positioning of a new blank while each work head is in inoperative position, means adapted to break the circuit to said electrically operated means as each work head is about to return into operative position to stop the turret rotation, means for short circuiting said last named means if the loading operations on any work head have been performed in the allotted time and means adapted to be operated thereafter by said work support in its return movement to operative position to restore the stop means to the drive circuit ready for operation when the next succeeding work support arrives at the loading station.

23. In a machine of the class described, a base, a turret rotatably mounted on the base, a work support pivotally mounted on the turret, a tool mounted on the turret, means for adjusting the work head and tool into operative relation, means for rotating the turret continuously, means for imparting a cutting movement to the tool and means for swinging the work head away from the tool at the loading station to permit removal of the completed work piece and positioning of a new blank and for swinging the work head back into operative position with relation to the tool after the new blank has been positioned, said last named means comprising a plate on the base provided with a cam trackway, a roller on the work head adapted to enter said trackway when the work head arrives at the loading station, a plate pivotally mounted on the base arranged to hold said roller in said trackway during its movement therein and resilient means for holding said plate in operative position.

24. In a machine of the class described, a carrier, a plurality of tools mounted on the carrier, means for actuating said tools and electrically operated means for stopping said machine upon failure of said tools to operate properly.

25. In a machine of the class described, a plurality of motors for actuating the various parts of the machine, a plurality of relays, one for each motor, wired in circuit with the motors and in series with each other, said relays being adapted to stop the machine in case of overload on the corresponding motor and means operative on functioning of any relay to indicate that the corresponding motor is overloaded.

26. In a machine for producing gears, a base, a pair of carriers mounted on the base, a work support mounted on one of the carriers, a tool support mounted on the other carrier, one of said carriers being angularly adjustable relative to the other and one of said supports being adjustable radially of the axis about which said angular adjustment takes place.

27. In a machine of the class described, a base, a turret rotatably mounted on the base, means for rotating the turret continuously, a plurality of work supports movably mounted on the turret, means operative during rotation of the turret for moving the work supports successively to inoperative position and back into operative position again at a loading station to permit removal of the completed work piece and positioning of a new blank while each work head is in inoperative position and means for automatically stopping the turret drive if the work has not been removed from and a new blank positioned on a work support in the time allotted to these operations at the loading station.

28. In a machine of the class described, a base, a turret rotatably mounted on the base, means for rotating the turret continuously, a plurality of work supports movably mounted on the turret, means operative during rotation of the turret for moving the work supports successively to inoperative position and back into operative position again at a loading station to permit removal of the completed work piece and positioning of a new blank while each work head is in operative position, cooperating means on each work support and the base adapted to stop the turret drive as each work support is about to return into operative position, means for manually rendering said stop mechanism inoperative for the time of movement of any work head at the loading station and cooperating means on each work head and the base adapted to thereafter automatically reset said automatic stop mechanism so that it will be capable of operation when the next succeeding work head arrives at the loading station.

29. In a machine of the class described, a base, a turret rotatably mounted on the base, electrically operated means for rotating the turret continuously, a plurality of work supports movably mounted on the turret, means operative during rotation of the turret for moving the work supports successively to inoperative position and back into operative position again at a loading station to permit removal of the completed work piece and positioning of a new blank while each work head is in inoperative position and means adapted to insure time for completion of these operations before each work head support returns to inoperative position comprising means adapted to break the circuit to said electrically operated means as each work head is about to start its return movement.

30. In a machine for producing gears, a base, a turret rotatably mounted thereon, a plurality of work spindles rotatable in said turret, a plurality of face milling cutters journaled in said turret, one of which is paired with each work spindle to operate on the blank carried thereby during rotation of the turret, means for rotating the tools, means for periodically indexing the work spindles during rotation of the turret, means for rotating the turret continuously, and means for automatically moving the work supports successively away from their respective tools when each reaches a predetermined position to permit removal of the completed gears and positioning of a new blank.

31. In a machine for producing gears, a base, a turret rotatably mounted thereon, a plurality of work supports pivotally mounted on said turret, a plurality of face milling cutters journaled in said turret, one of which is paired with each work support to operate on the blank carried by said work support during rotation of the turret, means for adjusting the several tools and work supports into operative relation, means for rotating the tools, means for rotating the turret continuously on its axis, and means for automatically swinging the work supports successively on their pivotal axes when each reaches a predetermined position to permit removal of the completed gear and positioning of a new blank.

32. In a machine for producing gears, a base, a turret rotatably mounted thereon, a plurality of work supports pivotally mounted on said turret, a work spindle rotatably mounted on each work support, a plurality of face milling cutters journaled in said turret, one of which is paired with each work spindle to operate on the blank carried thereby during rotation of the turret, means for adjusting the several tools and blanks into operative relation with each other, means for rotating the tools, means for imparting a continuous rotary movement to the turret, means for periodically indexing the work spindles during rotation of the turret, and means for automatically swinging the work supports successively about their respective pivotal axes when each reaches a predetermined position to permit removal of the completed gear and positioning of a new blank.

33. In a machine for producing gears, a base, a turret rotatably mounted thereon, a plurality of face milling cutters journaled in said turret, a plurality of work supports movably mounted on said turret, one of which is paired with each face milling cutter, means for adjusting the several tools and work supports into operative relation with each other, means for securing the work supports in operative position during cutting, means for rotating the tools continuously, means for imparting a continuous rotary motion to the turret, means for releasing the securing means successively when each work support reaches a predetermined position and means for therafter moving the work supports successively away from their respective tools to permit removal of the completed gear and positioning of a new blank.

34. In a machine for producing gears, a base, a turret rotatably mounted thereon, a plurality of face milling cutters journaled in said turret, a plurality of work supports movably mounted on said turret, one of which is paired with each tool, a work spindle rotatably mounted in each work support, means for adjusting the several tools and work supports into operative relation to each other, means for securing the work supports in operative position during the cutting operation, means for rotating the tools continuously, means for imparting a continuous rotary motion to the turret, means for indexing the work spindles periodically during rotation of the turret, means for releasing the work support securing means successively when each work support reaches a predetermined position and means for moving each work support when released away from its respective tool to permit removal of the completed blank from the work spindle and positioning of a new blank.

35. In a machine for producing gears, a base, a turret rotatably mounted thereon, a plurality of face milling cutters journaled in said turret, a plurality of work supports pivotally mounted on said turret, one of which is paired with each tool, means for adjusting the several tools and work supports into operative relation, means for securing the work supports in operative position during the cutting operation, means for rotating the tools continuously, means for imparting a continuous rotary motion to the turret, means for releasing the work support securing means successively when each work support reaches a predetermined position, and means for moving each work support when released about its pivotal axis to permit removal of the completed gear and positioning of a new blank.

36. In a machine for producing gears, a base, a turret rotatably mounted thereon, a plurality of face milling cutters journaled in said turret, a plurality of work supports pivotally mounted on the turret, one of which is paired with each tool, a work spindle rotatably mounted in each of said work supports, means for adjusting the several tools and work spindles into operative relation, means for securing the work supports in operative position during the cutting operation, means for rotating the tools continuously, means for imparting a continuous rotary motion to the turret, means for indexing the work spindles periodically during rotation of the turret, means for releasing the work support securing means successively when each work support reaches a predetermined position, and means for moving the work supports when released away from their respective tools about their pivotal axes to permit removal of the completed gears and positioning of a new blank.

37. In a machine of the class described, a base, a turret rotatably mounted thereon, a plurality of tools mounted on the turret a plurality of work supports pivotally mounted on said turret, one of which is paired with each tool, a work spindle journaled in each work support, means for imparting a cutting movement to the tools, means for rotating the turret continuously, means for indexing the work spindles periodically during rotation of the turret, and means for moving the work supports successively about their respective pivots when each reaches a predetermined position to swing the work supports successively away from their respective tools to permit removal of the completed work pieces and positioning of new blanks.

38. In a machine of the class described, a base, a turret rotatably mounted thereon, a plurality of tools mounted on the turret, a plurality of work supports pivotally mounted on the turret, means for imparting a cutting movement to the tools, means for securing the several work supports in operative position during the cutting operation, means for rotating the turret, and means for releasing the work support securing means successively as each work support reaches a predetermined position to permit movement of the work supports successively about their respective pivotal axes to permit swinging the work supports successively away from their respective tools for removal of the completed work and positioning of new blanks.

39. In a machine of the class described, a base, a turret rotatably mounted thereon, a plurality of tools mounted on the turret, a plurality of work supports movably mounted on the turret, a work spindle journaled in each work support, means for imparting a cutting movement to the tools, means for securing the several work supports in operative position during the cutting operation, means for rotating the turret continuously, means for indexing the work spindles periodically during rotation of the turret, and means for releasing the work support securing means successively as each work support reaches a predetermined position to permit movement of the work supports successively away from their respective tools for removal of the completed work pieces and positioning of new blanks.

40. In a machine of the class described, a base, a turret rotatably mounted thereon, a plurality of tools mounted on the turret, a plurality of work supports pivotally mounted on the turret, a work spindle journaled in each work support, means for imparting a cutting movement to the tools, means for securing the several work supports in operative position during the cutting operation, means for rotating the turret continuously, means for indexing the work spindles periodically during rotation of the turret, and means for releasing the work support securing means successively as each work support reaches a predetermined position to permit movement of the work supports successively away from their respective tools for removal of the completed work pieces and positioning of new blanks.

41. In a machine for producing gears, a base, a tool mounted on the base, a work support pivotally mounted on the base, means for adjusting the tool and work support into operative relation, means for imparting a cutting movement to the tool, means for securing the work support against pivotal movement during cutting, means for automatically releasing the securing means when the gear has been completed and means for thereafter automatically moving the work support about its pivotal axis to swing the work support away from the tool to permit removal of the completed gear and positioning of a new blank.

42. In a machine for producing tapered gears, a base, a tool mounted on the base, a work support pivotally mounted on the base, a work spindle journaled in the work support, means for adjusting the tool and work support into operative relation with the axis of the work angularly disposed to the plane of operation of the tool, means for imparting a cutting movement to the tool and means for automatically moving the work support about its pivotal axis when the work has been completed to swing the work spindle away from the tool to permit removal of the completed gear and positioning of a new blank.

43. In a machine for producing tapered gears, a base, a tool mounted on the base, a work support pivotally mounted on the base, a work spindle journaled in the work support, means for adjusting the tool and work support into operative relation with the axis of the work angularly disposed to the plane of operation of the tool, means for imparting a cutting movement to the tool, means for securing the work support against pivotal movement during cutting, means for automatically releasing said securing means when the work has been completed, and means for thereafter automatically moving the work support about its pivotal axis to move the work spindle away from the tool to permit removal of the completed gear and positioning of a new blank.

44. In a machine for producing tapered gears, a base, a face milling cutter rotatably mounted on the base, a work support pivotally mounted on the base, a work spindle journaled in the work support, means for adjusting the tool and work support into operative relation with the axis of the work angularly disposed to the axis of the tool, means for rotating the tool, means for imparting an alternate movement of feed and withdrawal periodically between the tool and work spindle, means for indexing the work spindle during each period of withdrawal, and means for automatically moving the work support about its pivotal axis when the gear has been completed to swing the work spindle away from the tool to permit removal of the completed gear and positioning of a new blank.

45. In a machine for producing tapered gears, a base, a face milling cutter rotatably mounted on the base, a work support pivotally mounted on the base, a work spindle journaled in the work support, means for adjusting the tool and work support into operative relation with the axis of the work angularly disposed to the axis of the tool, means for rotating the tool, means for securing the work support against movement during cutting, means for imparting an alternate movement of feed and withdrawal periodically between the tool and work spindle, means for indexing the work spindle during each period of withdrawal, means for automatically releasing the work support securing means when the gear has been completed and means for thereafter automatically moving the work support about its pivotal axis to swing the work spindle away from the tool to permit removal of the completed gear and positioning of a new blank.

46. In a machine for producing tapered gears, a base, a face milling cutter rotatably mounted on the base, a work support pivotally mounted on the base, a work spindle journaled in said work support, means for adjusting the tool and work support into operative relation with the axis of the work angularly disposed to the axis of the tool, means for rotating the tool, means for imparting periodically an alternate movement of feed and withdrawal to the work spindle in the direction of its axis, means for indexing the work spindle during each period of withdrawal, and means for automatically moving the work support about its pivotal axis when the gear has been completed to swing the work support away from tool to permit removal of the completed gear and positioning of a new blank.

47. In a machine for producing tapered gears, a base, a turret rotatably mounted on the base, a plurality of work supports movably mounted on the turret, a work spindle rotatably mounted in each work support, a plurality of face milling cutters rotatably mounted on the turret, one of which is paired with each work support, means for adjusting the tools and work spindles into operative relation with their axes angularly disposed to each other, means for rotating the tools, means for rotating the turret, means for imparting an alternate movement of feed and withdrawal to the several work spindles in the direction of their respective axes periodically during rotation of the turret, means for indexing the work spindles during the periods of withdrawal, and means for moving the work supports successively away from their respective tools when each has reached a predetermined position to permit removal of the completed gear and positioning of a new blank.

48. In a machine for producing gears, a base, a turret rotatably mounted thereon, a plurality of work supports pivotally mounted on said turret, a work spindle journalled in each work support, a plurality of face milling cutters journaled in the turret, one of which is paired with each work support, means for adjusting the tools and work supports into operative relation with each other, means for rotating the tools continuously, means for imparting a relative movement of feed and withdrawal periodically between the several tools and their respective work supports during rotation of the turret, means for indexing the work spindles during the periods of withdrawal, means for rotating the turret continuously, and means for automatically moving the work supports successively about their pivotal axes when each reaches a predetermined position to permit removal of the completed gear and positioning of new blanks.

49. In a machine for producing gears, a base, a turret rotatably mounted thereon, a plurality of work supports movably mounted on said turret, a work spindle rotatably mounted in each work support, a plurality of face milling cutters journaled in said turret, one of which is paired with each work support, means for adjusting the tools and work supports into operative relation with each other, means for rotating the tools continuously, means for securing the work supports against movement away from the tools during cutting, means for imparting periodically a relative movement of feed and withdrawal between each tool and its work spindle, means for indexing the work spindles during the periods of withdrawal, means for imparting a continuous rotary motion to the turret, means for releasing the work support securing means successively when each work support reaches a predetermined position, and means for thereafter successively moving the work supports away from their respective tools to permit removal of the completed gear and positioning of new blanks.

50. In a machine for producing gears, a base, a tool mounted on the base, a work support movably mounted on the base, means for clamping the blank in position on said work support, means for adjusting the tool and blank into operative relation, means for imparting a cutting movement to the tool, means for automatically moving the work support away from the tool when the work has been completed to permit removal of the completed work and chucking of a new piece and means actuated by said last named movement to release said clamping means.

51. In a machine of the class described, a base, a tool mounted thereon, a work support pivotally mounted on the base, means for clamping the blank in position on said work support, means for adjusting the tool and blank into operative relation, means for imparting a cutting movement to the tool, means for automatically moving the work support about its pivotal axis away from the tool when the work has been completed and means actuated by said movement to release said clamping means.

52. In a machine of the class described, a base, a tool mounted thereon, a work support pivotally mounted on the base, means for clamping the blank on said work support, means for adjusting the tool and blank into operative relation, means for imparting a cutting movement to the tool and means actuated by the pivotal movement of said work support to release said clamping means.

53. In a machine for producing gears, a base, a tool mounted thereon, a work support pivotally mounted on the base, a work spindle journaled in said work support, a rod movable axially in the bore of said spindle, means carried by said rod adapted to clamp the blank to said spindle, means constantly urging said rod into clamping position, a tiltable member adapted to be rocked from a position in alignment with to a position inclined to said rod to move the rod against the action of said spring to release the blank, a link connected at one end to the base eccentrically of said pivot and at its other end to said tiltable member whereby on pivotal movement of the work support, the tiltable member is rocked and the work released.

54. In a machine of the class described, a base, a tool support, a tool mounted thereon, a work support, one of said supports being pivotally mounted on the base for movement away from and toward the other support to permit removal of the completed work and bringing of a new piece into operative position, respectively, means for imparting a cutting movement to the tool, means for supplying a coolant to the work during cutting, and means operated by the pivotal movement of said movable support away from the other support to shut off said coolant and by the return movement of said movable support to turn said coolant on.

55. In a machine of the class described, a base, a tool support, a tool mounted thereon, a work support, one of said supports being pivotally mounted on said base for movement away from the other support to permit removal of the completed work and bringing of a new piece into operative position, respectively, means for imparting a cutting movement to the tool, a pipe extending to the vicinity of the work for supplying a coolant during cutting and a valve mounted therein, one of which is secured to the base and the other to the movable support, whereby when said support is swung away from or returned into cutting position, the flow of coolant is shut off or turned on, respectively.

56. In a machine for producing gears, a base, a tool mounted on the base, a work support mounted on the base, work spindle journaled in said work support, means for adjusting the tool and work spindle into operative relation, means for imparting a cutting movement to the tool, a camshaft, a pair of cams mounted thereon, cooperating means between one of said cams and the work support for imparting an alternate movement of feed and withdrawal to the work support, indexing mechanism for the work spindle, and cooperating means between the second cam and indexing mechanism for actuating the index mechanism during each period of withdrawal.

57. In a machine for producing gears, a base, a tool mounted on the base, a work support mounted on the base, a work spindle journaled in said work support, means for adjusting the tool and work into operative relation, means for imparting a cutting movement to the tool, means for locking the work spindle against movement relative to the work support during cutting, a cam shaft, a pair of cams mounted thereon, cooperating means between one of said cams and the work support for imparting an alternate movement of feed and withdrawal to the work support, indexing mechanism for the work spindle, and means adapted to be actuated by the second cam for first releasing said locking means and thereafter indexing the work spindle and for relocking said spindle after it has been indexed.

58. In a machine for producing gears, a base, a pair of carriers mounted on the base, one of which is angularly adjustable relative to the other, a plurality of work supports mounted on one carrier, a plurality of tool supports mounted on the other carrier and adjustable thereon in a direction perpendicular to the axis about which the first angular adjustment takes place, the several tool supports being paired each with one work support, a rotary annular face milling cutter mounted on each tool support, the described adjustment permitting setting the tools to cut gears of different spiral angles, means for securing the carriers together after adjustment for rotation together on the base, means for rotating the tools and means for rotating said carriers.

59. In a machine for producing tapered gears, a base, a pair of carriers mounted on the base, one of which is angularly adjustable relatively to the other, a plurality of work supports mounted on one carrier, a plurality of tool supports mounted on the other carrier one of which is paired with each work support, a rotary annular face milling cutter mounted on each tool support, said tool supports being adjustable on said carrier in a direction perpendicular to the axis of the first adjustment to permit setting the tools by means of the two adjustments to cut gears of different spiral angles, said tool supports being, also, angularly adjustable on their carrier to permit cutting gears of different dedendum angles, means for securing the two carriers together for rotation together on the base, means for rotating the tools, and means for rotating the carrier.

60. In a machine of the class described, a base, a turret rotatably mounted on the base, a plurality of work supports mounted on the turret, a plurality of tools mounted on the turret, one of which is paired with each work support, means for actuating the tools, means for rotating the turret continuously, means for imparting a relative feed movement between each work support and its tool during rotation of the turret, a cam on the base, and cooperating means between each work support and said cam adapted to operate when each work support has reached a predetermined position to move each work support away from its respective tool, to permit removal of the completed work and positioning of new blanks.

61. In a machine of the class described, a base, a turret rotatably mounted on the base, a plurality of work supports pivotally mounted on said turret, a plurality of tools mounted on the turret, one of which is paired with each work support, means for actuating the tools, means for rotating the turret continuously, a cam on the base, means carried by each work support adapted to cooperate with said cam as each work support reaches a predetermined position to move the work supports about their respective pivots away from their respective tools, successively, to permit removal of the completed work and positioning of new blanks.

62. In a machine of the class described, a base, a turret rotatably mounted on the base, a plurality of work supports mounted on said turret, a plurality of tools mounted on the turret, one of which is paired with each work support, a work spindle journaled in each work support, means for clamping the work to each work spindle, means for actuating the tools, means for rotating the turret continuously, means for moving the work supports successively away from their respective tools as each reaches a predetermined position to permit removal of the completed work and chucking of a new piece and means actuated by the last named movement for releasing the work clamping means.

63. In a machine for producing gears, a base, a turret rotatably mounted thereon, a plurality of work supports pivotally mounted on the turret, a plurality of tools mounted on said turret, one of which is paired with each work support, a work spindle journaled in each work support, means for clamping a work piece to each spindle, means for actuating the tools, means for rotating the turret continuously, means for successively moving the work supports about their respective pivotal axes when each reaches a predetermined position to move the work supports successively away from their respective tools and means actuated by said movement in each case for releasing said clamping means.

64. In a machine of the class described, a base, a turret rotatably mounted on the base, a plurality of work supports pivotally mounted on the turret, a plurality of tools mounted on the turret, one of which is paired with each work support, a work spindle journaled in each work support, means for clamping a work piece to each work spindle comprising a rod movable in the bore of the work piece and of the spindle and spring means constantly urging said rod into clamping position, means connected to the turret adapted to cooperate with each rod on pivotal movement of each work support away from its tool to move said rod against actuation of the spring to release the work, means for actuating the tools, means for rotating the turret continuously, and means for moving the work supports successively about their pivotal axes when each reaches a predetermined position to move said supports away from their respective tools.

65. In a machine of the class described, a base, a turret rotatably mounted on the base, a plurality of work supports, a plurality of tools mounted on the turret, one of which is paired with each work support, each work support being mounted on said turret for movement away from its respective tool to permit removal of the completed work and chucking of a new piece, a work spindle journaled in each work support, means for clamping a work piece to each work spindle including a rod movable in the bore of the work piece and of the spindle and spring means constantly urging said rod into clamping position, means connected to the turret adapted to cooperate with each rod on movement of each work support away from its tool to move said rod against the actuation of said spring to release the work, means for actuating the tools, means for rotating the turret continuously and means for moving the work supports successively away from their respective tools as each reaches a predetermined position.

66. In a machine for producing gears, a base, a turret rotatably mounted thereon, a plurality of work supports pivotally mounted on the turret, a plurality of tools mounted on the turret, one of which is paired with each work support, means for supplying a coolant to each work support during cutting, means for actuating the tools, means for rotating the turret continuously, means for successively moving the work supports about their respective pivots when each reaches a predetermined position to permit removal of the completed work and chucking of a new piece and means actuated by said last named movement for shutting off the coolant supply to the support being moved.

67. In a machine of the class described, a base, a turret rotatably mounted on the base, a plurality of work supports pivotally mounted on the turret, a plurality of tools mounted on the turret, one of which is paired with each work support, means for supplying a coolant to each work piece during cutting, means for actuating the tools, means for rotating the turret continuously, means for successively moving the work supports about their respective pivotal axes when each reaches a predetermined position to permit removal of the completed work and chucking of a new blank and for returning the work supports into operative position when the new blank has been chucked, and means actuated by said last named movements for shutting off the coolant and turning it on again, respectively.

68. In a machine of the class described, a base, a turret rotatably mounted on the base, a plurality of work supports movably mounted on the turret, a plurality of tools mounted on the turret, one of which is paired with each work support, a means for clamping a work piece to each work support, means for supplying a coolant to each work piece during cutting, means for actuating the tools, means for rotating the turret, means for moving the work supports successively away from their respective tools when each reaches a predetermined position, and means actuated by said movement for releasing the clamping means and shutting off the coolant supply to the work support being moved.

69. In a machine of the class described, a base, a turret, rotatably mounted on the base, a plurality of work supports pivotally mounted on the turret, a plurality of tools mounted on the turret, one of which is paired with each work support, means for clamping a work piece to each work support, means for supplying a coolant to each work piece during cutting, means for actuating the tools, means for rotating the turret continuously, means for moving the work supports successively about their respective pivotal axes when each reaches a predetermined position to move them successively away from their respective tools, and means actuated by said last named movement for releasing the clamping means and shutting off the coolant supply to the work support being moved.

70. In a machine of the class described, a base, a turret, rotatably mounted on the base, a plurality of work supports pivotally mounted on the turret, a plurality of tools mounted on the turret, one of which is paired with each work support, means for clamping a work piece to each work support, means for supplying a coolant to each work piece during cutting, means for actuating the tools, means for rotating the turret continuously, a cam secured to the base, means on each work support adapted to cooperate with the cam when each reaches a predetermined position to swing the work supports successively about their respective pivotal axes to move them away from their respective tools and means actuated by the movement of each work support for releasing its clamping means and shutting off the coolant supply to it.

71. In a machine of the class described, a base, a turret rotatably mounted on the base, a plurality of tools mounted on the turret, a plurality of work supports, one of which is paired with each tool, mounted on the turret for movement toward and away from their respective tools to permit removal of the completed work and bringing of a new piece into cutting position, means for locking each work support against the last described movement during cutting, means for clamping a work piece to each work support, means for actuating the tools, means for rotating the turret continuously, means adapted to release the locking means successively when each work support reaches a predetermined position, means for moving each work support away from its tool when released, and means actuated by said last named movement for releasing the clamping means of said work support.

72. In a machine of the class described, a base, a turret rotatably mounted on the base, a plurality of tools mounted on the turret, a plurality of work supports, one of which is paired with each tool, mounted on the turret for movement toward and away from their respective tools to permit removal of the completed work and bringing of a new piece into cutting position, means for locking each work support against the last described movement during cutting, means for clamping a work piece to each work support, means for supplying a coolant to each work piece during cutting, means for actuating the tools, means for rotating the turret continuously, means adapted to release the locking means successively when each work support reaches a predetermined position, means for moving each work support away from its tool when released, and means actuated by said movement for releasing the clamping means and shutting off the coolant supply to the work support being moved.

73. In a machine for producing gears, a base, a turret rotatably mounted thereon, a plurality of tools mounted on the turret, a plurality of work supports movably mounted on the turret, one of which is paired with each tool, a work spindle journaled in each work support, means for moving the work pieces periodically toward and away from their respective tools during rotation of the turret to impart an alternate movement of feed and withdrawal to the blanks being cut, means for indexing the work spindles during each period of withdrawal, means for locking the work supports in operative relation with their respective tools during cutting, means for actuating the tools, means for rotating the turret continuously, and means adapted to be actuated into position as the work supports successively reach a predetermined position and during the last feed movement of each support in the cutting of a blank to release the locking means on the subsequent withdrawal movement, thereby permitting said support to be moved to inoperative position for removal of the completed gear and positioning of new blanks.

74. In a machine for producing gears, a base, a turret rotatably mounted thereon, a plurality of tools mounted on the turret, a plurality of work supports movably mounted on the turret, one of which is paired with each tool, a work spindle journaled in each work support, means for moving the work pieces periodically toward and away from their respective tools during rotation of the turret to impart an alternate movement of feed and withdrawal to the blanks being cut, means for indexing the work spindles during each period of withdrawal, means for locking the work supports in operative relation with their respective tools during cutting, means for actuating the tools, means for rotating the turret continuously, means adapted to be actuated into position as the work supports successively reach a predetermined position and during the last feed movement of each support in the cutting of a blank to release the locking means on the subsequent withdrawal movement, and means for thereafter moving the released work support to inoperative position to permit removal of the completed gear and positioning of new blanks.

75. In a machine for producing gears, a base, a turret rotatably mounted thereon, a plurality of tools mounted on said turret, a plurality of work supports pivotally mounted on said turret one work support being paired with each tool, a work spindle journaled in each work support, means for moving the work pieces periodically toward and away from their respective tools during rotation of the turret to impart an alternate movement of feed and withdrawal to the blanks being cut, means for indexing the work spindles during each period of withdrawal, means for locking the work supports in operative relation with their respective tools during cutting, means for actuating the tools, means for rotating the turret continuously, means adapted to be actuated into position as the work supports successively reach a predetermined position and during the last feed movement of each support in the cutting of a blank to release the locking means on the subsequent withdrawal movement, and means for swinging the work supports about their respective pivotal axes when released to permit removal of the completed gear and positioning of a new blank.

76. In a machine for producing gears, a base, a turret rotatably mounted thereon, a plurality of tools mounted on the turret, a plurality of work supports movably mounted on the turret, one of which is paired with each tool, a work spindle journaled in each work support means for moving the work supports in the direction of their pivotal axes periodically during the rotation of the turret to impart an alternate movement of feed and withdrawal to the blank being cut, means for indexing the work spindles during each period of withdrawal, means for locking the work supports against movement about their pivotal axes during cutting, means for actuating the tools, means for rotating the turret continuously, means adapted to be actuated into position as the work supports successively reach a predetermined position and during the last feed movement of each support in the cutting of a blank to release the locking means on the subsequent withdrawal movement, and means for moving the work supports about their pivotal axes when released to permit removal of the completed gear and positioning of a new blank.

77. In a machine for producing gears, a base, a turret rotatably mounted on the base, a plurality of tools mounted on the turret, a plurality of work supports movably mounted on the turret, one of which is paired with each tool, a work spindle journaled in each work support, means for moving the work supports toward and away from their respective tools during rotation of the turret to impart an alternate movement of feed and withdrawal to the blank being cut, means for locking the work supports in operative relation with their respective tools during cutting, a rod slidably mounted in each work support adapted on movement in one direction relative to said support to release said locking means, means for actuating the tools, means for rotating the turret continuously, a member on each work support adapted to be moved into registration with the respective rods to hold the same on withdrawal movement of the work support to thereby trip the locking means, and a cam on the base adapted to cooperate with said last named members successively as each work support reaches a predetermined position to move said members into releasing position.

78. In a machine for producing gears, a base, a turret rotatably mounted on the base, a plurality of tools mounted on the turret, a plurality of work supports movably mounted on the turret, one of which is paired with each tool, a work spindle journaled in each work support, means for moving the work supports toward and away from their respective tools during rotation of the turret to impart an alternate movement of feed and withdrawal to the blanks being cut, means for locking the work supports in operative relation with their respective tools during cutting, a rod slidably mounted in each work support, adapted on movement in one direction relative to the work support to release said locking means, means for actuating the tools, means for rotating the turret continuously, a member on each work support adapted to be moved into registration with said rod to hold the same on withdrawal movement of the work support to thereby trip said locking means, a cam on the base adapted to cooperate with said last named members successively as each work support successively reaches a predetermined position to move said members into releasing position, a second cam on the base, and cooperating means carried by each work support adapted to successively cooperate with said second cam to move each work support to inoperative position after being released to permit removal of the completed gear and positioning of a new blank.

79. In a machine for producing gears, a base, a turret rotatably mounted on the base, a plurality of work supports mounted on the turret, a plurality of tools mounted in the turret, one of which is paired with each work support, a work spindle journaled in each work support, a plurality of cam shafts rotatably mounted in the turret, one for each work support, a pair of cams mounted on each shaft, means on each work support cooperating with one of said cams to impart an alternate movement of feed and withdrawal between the tools and blank periodically during rotation of the turret, indexing mechanism for each work spindle, means on each work support adapted to be operated by the other cam for actuating the indexing mechanism during each period of withdrawal, means for rotating the turret continuously, a cam on the base, and means on each work support adapted to cooperate with said last named cam to move the work supports successively away from their respective tools when each reaches a predetermined position to permit removal of the completed gear and positioning of new blanks.

80. In a machine for producing gears, a base, a work support pivotally mounted on the base, means for locking the work supports against pivotal movement comprising a bar carried by the base and a pair of jaws, one of which is fixed and the other movable, secured to said work support and adapted to cooperate to grip said bar, means urging the movable jaw constantly into locking position, and means adapted to be actuated to release said movable jaw to permit pivotal movement of the work support for removal of the completed gear and chucking of a new blank.

81. In a machine for producing gears, a base, a turret, rotatably mounted on the base, a plurality of tools mounted on the turret, a plurality of work supports mounted on the turret for movement toward and away from the tools to permit removal of the completed work and bringing of a new blank into cutting position, one of said work supports being paired with each tool, means for actuating the tools, means for rotating the turret continuously, means for securing each work support in operative position during cutting, comprising a bar carried by the turret, and a pair of jaws, one of which is fixed and the other movable, secured to each work support and adapted to cooperate to grip the corresponding bar, means urging the movable jaws constantly into locking position, means on each work support adapted to be moved into position to release said jaws, and means on the base adapted to actuate said last named means into operating position as the work supports successively reach a predetermined position.

82. In a machine for producing gears, a base, a turret rotatably mounted on the base, a plurality of tools mounted on the turret, a plurality of work supports mounted on the turret for movement toward and away from the tools to permit removal of the completed gear and bringing of a new blank into cutting position, one of said work supports being paired with each tool, a work spindle journaled in each work support, means for actuating said tools, means for rotating the turret continuously, means for imparting an alternate movement of feed and withdrawal periodically to each work support during rotation of the turret, means for indexing each work spindle during the periods of withdrawal, means for securing each work support in operative relation with its tool during cutting comprising a bar secured to the turret and a pair of jaws, one of which is fixed and the other movable, secured to each work support and adapted to cooperate to grip the corresponding bar, means urging the movable jaw constantly into locking position, a member mounted on each work support adapted on movement relative to the work support to trip said movable jaw and release the same, a cam on the base, and means on each work support adapted to be moved by said cam successively, during the last feed movement imparted to the blanks carried thereby, into engagement with the last named member to hold the same against movement with the work support on the subsequent withdrawal movement of said work support thereby to trip said movable jaw and release the same.

83. In a machine for producing gears, a base, a turret rotatably mounted on the base, a plurality of tools mounted on the turret, a plurality of work supports mounted on the turret, for movement toward and away from the tools to permit removal of the completed gear and bringing of a new blank into cutting position, one of said work supports being paired with each tool, a work spindle journaled in each work support, means for actuating the tools, means for rotating the turret continuously, means for imparting an alternate movement of feed and withdrawal periodically to each work support during rotation of the turret, means for indexing each work spindle during the periods of withdrawal, means for securing each work support in operative relation with its tool during cutting comprising a bar secured to the turret and a pair of jaws, one of which is fixed and the other movable, secured to each work support and adapted to cooperate to grip the corresponding bar, means urging the movable jaw constantly into locking position, a member mounted on each work support adapted on movement relative to the work support to trip said movable jaw and release the same, a cam on the base, means on each work support adapted to be moved by said cam, during the last feed movement imparted to the blank carried by each support, into engagement with the last named member for holding the same against movement with the work support on the subsequent withdrawal movement of said work support thereby to trip said jaw and release the same, a second cam mounted on the base and means on each work support adapted to cooperate with the second cam, when the work supports are released, to move the work supports successively about their respective axes and away from their respective tools.

84. In a machine of the class described, a base, a turret rotatably mounted on the base, a plunger pump mounted on one of said parts, a cam mounted on the other part adapted to reciprocate said plunger pump to lubricate the mechanism of the machine, spring means adapted to move the plunger in a direction opposite to that in which it moves under actuation of the cam to position the plunger for operation by the cam, a control device mounted on one of the aforesaid parts for preventing movement of said plunger under actuation of said spring during a predetermined variable number of rotations of the turret, and a cam mounted on the other part for imparting a step by step movement to said control device to trip same after the predetermined number of rotations of the turret have been completed.

85. In a machine for producing gears, a base, a turret rotatably mounted on the base, a plurality of rotary face milling cutters mounted on the turret, a plurality of work supports mounted on the turret, one of which is paired with each tool support, a work spindle journaled in each work support, indexing mechanism for each work spindle, means for rotating the tools, a main drive shaft extending coaxially of the turret, means for driving said shaft continuously from a source of power, a plurality of cam shafts journaled in said turret, one for each work support, a plurality of shafts extending radially of said main drive shaft and driven therefrom, means for driving said cam shafts from said radial shafts, a pair of cams secured to each cam shaft, one of which is adapted to impart an alternate movement of feed and withdrawal periodically to the corresponding work support during rotation of the turret and the other of which is adapted to operate the corresponding indexing mechanism during the periods of withdrawal, a ring gear secured to the turret, means driven from one of said radial shafts for rotating said ring gear to rotate the turret, a cam on the base, and means on each work support adapted to cooperate with said cam as each work support successively reaches a predetermined position to permit removal of the completed gears and return each work support into operative position with a new blank positioned thereon.

86. In a machine for producing gears, a base, a turret rotatably mounted thereon, a plurality of work supports pivotally mounted in said turret, a work spindle journaled in each work support, a plurality of tools mounted on said turret, one of which is paired with each work spindle to operate on the blank carried thereby during rotation of the turret, means for adjusting the several tools and work spindles into operative relation with each other, means for actuating the tools, means for rotating the turret continuously on its axis, means for imparting alternately a relative movement of feed and withdrawal between the several tools and their respective work spindles periodically during rotation of the turret, means for indexing the work spindles during the periods of withdrawal, and means for automatically swinging the work supports successively on their pivotal axes away from their respective tools when each work support reaches a predetermined position to permit removal of the completed gear and positioning of new blanks.

87. In a machine for producing tapered gears, a base, a turret rotatably mounted on the base for movement about a vertical axis, a plurality of tool supports mounted on the turret, an annular face mill journaled in each tool support, a plurality of work supports pivotally mounted on the turret for movement about axes parallel to the axis of the turret, one of said work supports being paired with each tool support, a work spindle journaled in each work support with its axis parallel to the pivotal axis of said support, means for adjusting the several tools and work spindles into operative relation with each other, with the axis of each tool inclined to the axis of the corresponding work spindle, means for rotating the tools, means for rotating the turret continuously, means for imparting periodically an alternate movement of feed and withdrawal to the work spindles in the direction of their axes during rotation of the turret, means for indexing the work spindles during the periods of withdrawal, and means for successively moving the work supports about their respective pivotal axes when each reaches a predetermined position to move the work supports successively away from their respective tools to permit removal of the completed gear and positioning of new blanks.

88. In a machine of the class described, a carrier, a plurality of tools mounted on the carrier, separate motors for operating each tool, a plurality of overload relays, one of which is adapted to cooperate with each motor, wired in circuit with the motors and in series with each other for stopping said motors when any one of them is overloaded, an indicating device operatively associated with each relay, means constantly urging each indicating device into operative position, and means associated with each relay and adapted to be tripped by the functioning thereof for normally holding the corresponding indicating device in operative position.

89. In a machine of the class described, a carrier, a plurality of tools mounted on the carrier, separate motors for operating each tool, a plurality of overload relays, one of which is adapted to cooperate with each motor and which are wired in circuit with the motors and in series with each other for stopping said motors when any one of them is overloaded and means actuated by the functioning of any one of said relays to indicate which motor has become overloaded.

90. In a machine of the class described, a turret, a plurality of tools mounted on the turret, one of which is paired with each tool, separate motors for actuating each tool and for rotating the turret, a plurality of overload relays wired in circuit with the motors and in series with each other for stopping the tool motors and the turret when any one of the tool motors is overloaded and means actuated by the functioning of any one of said relays to indicate which tool motor has become overloaded.

91. In a machine for producing gears, a base, a pair of carriers mounted on the base, a plurality of work supports mounted on one of said carriers, a plurality of tool supports mounted on the other carrier, each of said tool supports being paired with a corresponding work support, one of said carriers being angularly adjustable relative to the other, one of said supports being adjustable radially of the axis about which said angular adjustment takes place and one of said supports being angularly adjustable on this carrier about an axis perpendicular to the axis about which the angular relative adjustment of the carriers takes place, means for actuating the tools, means for securing the carriers together after adjustment and means for rotating said carriers when secured together.

92. In a machine of the class described, a base, a turret rotatably mounted on the base, electrically operated means for rotating the turret continuously, a plurality of work supports movably mounted on the turret, means operative during rotation of the turret, for moving the work supports successively to inoperative position and back into operative position again at a loading station, to permit removal of the completed work piece and positioning of a new blank while each work head is in operative position, means adapted to insure time for the completion of these operations before each work head returns to inoperative positions comprising means adapted to break the circuit to said electrically operative means as each work head is about to start its return movement, manually operable electrical means for rendering the stop device inoperative for the time of movement of any work head at the loading station and electrically operative means for thereafter automatically resetting said stop device so that it will be capable of operation when the next succeeding work head arrives at the loading station.

93. In a machine of the class described, a base, a turret rotatably mounted on the base, electrically operative means for rotating the turret continuously, a plurality of work supports movably mounted on the turret, means operative during rotation of the turret for moving said work supports successively to inoperative position and back into operative positions again at a loading station to permit removal of the completed work pieces and positioning of new blanks, an electric switch device wired in circuit with the electrically operative means for rotating the turret, means on each work head adapted to contact with said switch device at a predetermined point in the movement thereof at the loading station to break the circuit to said turret rotating means to stop the turret rotation, manually operable means for short circuiting the switch, a second electric switch mounted on the base and means on each work head adapted to contact with said second switch to restore the first switch to the main circuit if said manually operable means has been operated while a work support is at the loading station.

94. In a machine of the class described, a base, a turret rotatably mounted on the base, means for rotating the turret continuously, a plurality of work supports movably mounted on the turret, means operative during rotation of the turret for moving the work supports successively to inoperative position and back into operative positions again at a loading station to permit removal of the completed work piece and positioning of a new blank while each work head is at the loading station and means for automatically stopping the turret drive if the work has not been removed from and a new blank positioned on a work support in the time alotted to these operations at the loading station and means for rendering the automatic stop mechanism inoperative for the remainder of the loading movement of said turret if these operations have been completed in less than the allotted time.

95. In a machine of the class described, a base, a turret rotatably mounted on the base, means for rotating the turret continuously, a plurality of work supports movably mounted on the turret, means operative during rotation of the turret for moving the work supports successively to inoperative position and back into operative position again at a loading station, to permit removal of the completed work piece and positioning of a new blank while each work head is in inoperative position, means for automatically stopping the turret drive if the work has not been removed from and a new blank positioned on a work support in the time alotted to these operations at the loading station and means for manually rendering the automatic stop mechanism inoperative for the remainder of the loading movement of said head if these operations have been completed in less than the allotted time.

96. In a machine of the class described, a base, a turret rotatably mounted on the base, means for rotating the turret continuously, a plurality of work supports movably mounted on the turret, means operative during rotation of the turret for moving the work supports successively to inoperative position and back into operative position again at a loading station, to permit removal of the completed work piece and positioning of a new blank while each work head is in inoperative position, means for automatically stopping the turret drive if the work has not been removed from and a new blank positioned on a work support in the time allotted to these operations at the loading station, means for rendering the automatic stop mechanism inoperative for the remainder of the loading station movement of said head if these operations have been completed in less than the allotted time and means for thereafter resetting the automatic stop mechanism so that it will be capable of operation when the next succeeding work head arrives at the loading station.

97. In a machine of the class described, a base, a turret rotatably mounted on the base, means for rotating the turret continuously, a plurality of work supports movably mounted on the turret, means operative during rotation of the turret for moving the work supports successively to inoperative position and back into operative position, again at a loading station to permit removal of the completed work piece and positioning of a new blank while each work head is in inoperative position, means for automatically stopping the turret drive if the work has not been removed from and a new blank positioned on the work support in the time allotted to these operations at the loading station, means for manually rendering the automatic stop mechanism inoperative for the remainder of the movement of the said head at the loading station, if these operations have been completed in less than the allotted time and means for thereafter automatically resetting the automatic stop mechanism so that it will be capable of operation when the next succeeding work head arrives at the loading station.

98. In a machine for producing tapered gears, a base, a tool mounted on the base, a work support pivotally mounted on the base, a work spindle journaled in said work support, means for adjusting the tool and work into operative relation with the axis of the work angularly disposed to the plane of operation of the tool, means for actuating the tool, means for imparting an alternate movement of feed and withdrawal to the work spindle in the direction of its axis, means for indexing the work spindle during the periods of withdrawal, and means for automatically moving the work support about its pivotal axis when the gear has been completed to permit removal of the completed gear and positioning of a new blank.

99. In a machine for producing tapered gears, a base, a tool mounted on the base, a work support, a work spindle journaled in said support, said support being mounted on said base for pivotal movement about an axis parallel to the axis of the work spindle, means for adjusting the tool and work into operative relation with the axis of the work angularly disposed to the plane of operation of the tool, means for actuating the tool, means for imparting an alternate movement of feed and withdrawal to the work spindle in the direction of its axis, means for indexing the work spindle during the periods of withdrawal, and means for automatically moving the work support about its pivotal axis when the gear has been completed to permit removal of the completed gear and positioning of a new blank.

100. In a machine for producing gears, a base, a turret rotatably mounted thereon, a plurality of work supports pivotally mounted on the turret, a work spindle journaled in each work support, a plurality of tools mounted on the turret, one of which is paired with each work spindle to operate on the blank carried thereby during rotation of the turret, means for adjusting the several tools and work supports into operative relation with each other with the axis of each work spindle angularly disposed to the plane of operation of the corresponding tool, means for actuating the tools, means for imparting an alternate movement of feed and withdrawal between each tool and the corresponding work spindle in the direction of the axis of the work spindle, means for indexing the work spindles during the periods of withdrawal, means for rotating the turret continuously, and means for automatically moving the work supports on their pivots successively as each reaches a predetermined position to permit removal of the completed gear from the work spindle and chucking of a new blank.

101. In a machine for producing gears, a base, a turret rotatably mounted on the base, a plurality of work supports mounted on the turret, a plurality of tools mounted on the turret, one of which is paired with each work support to operate on the blank carried thereby during the rotation of the turret, means for adjusting the several tools and work supports into operative relation, means for securing the work support in operative position, means for actuating the tools, means for imparting a continuous rotary motion to the turret, means for releasing the work support securing means successively as each work support reaches a loading station and means for thereafter moving the work supports successively away from their respective tools to permit removal of the completed gear and positioning of a new blank.

102. In a machine for producing gears, a base, a turret rotatably mounted on the base, a plurality of work supports mounted on the turret, a plurality of tools mounted on the turret, one of which is paired with each work support, means for actuating the tools, means for rotating the turret continuously, means for imparting a relative feed movement between each work support and its tool during the rotation of the turret, a cam on the base, and cooperating means between each work support and said cam adapted to operate when each work support has reached the loading station to move each work support successively in a direction at an angle to the direction of the feed movement to permit removal of the completed work and positioning of a new blank.

103. In a machine for producing gears, a base, a turret rotatably mounted on the base, a plurality of work supports mounted on the turret, a plurality of tools mounted on the turret, one of which is paired with each work support, means for actuating the tools, means for rotating the turret continuously, means for imparting an alternate movement of feed and withdrawal between each work support and its tool during the rotation of the turret, means for indexing the work support during the period of withdrawal, a cam on the base, and cooperating means between each work support and said cam adapted to operate when each work support has reached the loading station to swing the work supports successively about their respective pivots in a direction at an angle to the direction of the feed movement to permit removal of the completed gear and chucking of a new blank.

104. In a machine for producing gears, a base, a turret rotatably mounted thereon, a plurality of work spindles journaled in the turret with their axes substantially parallel to the axis of the turret, a plurality of face mill cutters, one for each work spindle, supports for said cutters adjustable angularly on the turret to position the tip surfaces of the cutters in the correct cutting planes, means for rotating the cutters, means for rotating the turret, and means for imparting a feeding movement between the cutters and work spindles during rotation of the turret.

105. In a machine for producing gears, a base, a turret rotatably mounted thereon, a plurality of work spindles and a plurality of face mill cutters mounted on the turret and arranged in pairs so that one cutter operates solely on the blank carried by a single work spindle during rotation of the turret and so that the axis of one member of a pair is parallel to the axis of the turret and the axis of the other member is angularly adjustable relative thereto to dispose the axis of the work spindle angularly to the plane of operation of the corresponding cutter, means for rotating the cutters, means for rotating the turret, and means for feeding each work spindle relative to the corresponding cutter.

106. In a machine for producing gears, a base, a turret rotatably mounted thereon, a plurality of tools mounted on the turret, a plurality of work supports, guide members secured to the turret on which said work supports are movable for feeding the blanks carried thereby relative to the tools during rotation of the turret, means for producing said feeding movement, means for imparting cutting movements to the tools, means for rotating the turret, and means for automatically swinging each work support about one of its guide members in a direction inclined to the direction of its feed movement when it reaches loading position.

EDWARD W. BULLOCK.
ALBERT P. SCHAUSEIL.
ALFRED W. DRAESEKE.
CLARENCE T. GALLOWAY.
MAXWELL H. HILL.